(12) United States Patent
Cheung

(10) Patent No.: US 7,944,713 B2
(45) Date of Patent: May 17, 2011

(54) ELECTRIC POWER CONVERSION CIRCUIT HAVING TRANSFER GAIN VARIABLE BY PULSE-WIDTH MODULATION

(75) Inventor: Chi Hung Cheung, Tseung Kwan O (HK)

(73) Assignee: PI International Ltd., Tortola (VG)

( * ) Notice: Subject to any disclaimer, the term of this patent is extended or adjusted under 35 U.S.C. 154(b) by 122 days.

(21) Appl. No.: 12/320,853

(22) Filed: Feb. 6, 2009

(65) Prior Publication Data
US 2010/0202158 A1    Aug. 12, 2010

(51) Int. Cl.
*H02M 3/335* (2006.01)
*H02M 7/5387* (2006.01)
(52) U.S. Cl. ............... 363/16; 363/17; 363/25; 363/132
(58) Field of Classification Search .......... 363/25, 363/91, 132, 16, 17
See application file for complete search history.

(56) References Cited

U.S. PATENT DOCUMENTS

| | | | | | |
|---|---|---|---|---|---|
| 3,303,406 | A | * | 2/1967 | Bedford | 363/138 |
| 3,349,314 | A | * | 10/1967 | Giannamore | 363/139 |
| 3,938,024 | A | * | 2/1976 | Clarke | 363/24 |
| 4,709,323 | A | * | 11/1987 | Lien | 363/97 |
| 4,716,509 | A | * | 12/1987 | Roccucci | 363/26 |
| 4,805,080 | A | * | 2/1989 | Nieminen | 363/56.07 |
| 5,847,942 | A | * | 12/1998 | Bazinet et al. | 363/25 |
| 5,991,169 | A | * | 11/1999 | Kooken | 363/17 |
| 6,314,002 | B1 | * | 11/2001 | Qian et al. | 363/21.04 |
| 6,587,356 | B2 | * | 7/2003 | Zhu et al. | 363/17 |
| 6,671,193 | B1 | * | 12/2003 | Pelkonen | 363/53 |
| 7,324,355 | B2 | * | 1/2008 | Iwamoto et al. | 363/21.01 |

* cited by examiner

*Primary Examiner* — Shawn Riley
(74) *Attorney, Agent, or Firm* — Rosenberg, Klein & Lee

(57) ABSTRACT

The present invention discloses a single stage DC to DC electric power conversation circuit which has a transfer gain variable by pulse-width modulation over a continuum from zero to beyond unity. Conversion efficiency of the circuit is optimal when the transfer gain is set to its middle range, where a large part of power is transferred from input directly to output without undergone electro-magnetic conversion. Conversion efficiency is therefore very high and such a high efficiency occurs under normal operating condition.

27 Claims, 16 Drawing Sheets

US 7,944,713 B2

ELECTRIC POWER CONVERSION CIRCUIT HAVING TRANSFER GAIN VARIABLE BY PULSE-WIDTH MODULATION

BACKGROUND OF THE INVENTION

1. Field of the Invention

The present invention is related to a single stage DC to DC electric power conversion circuit having a transfer gain variable by pulse-width modulation over a continuum from zero to beyond unity.

2. Description of Related Art

By definition, transfer gain of a power conversion circuit is the ratio of output voltage to input voltage. In order to provide output voltage regulation against dynamic variations in input voltage, the transfer gain must be variable. The transfer gain must also be variable in both directions (i.e., increase or decrease) to cope with input voltage variations in both directions. Taken into account the input voltage variations under abnormal conditions, like mains line brown-out or transient on lightning, the input voltage may vary over a very wide range.

Therefore, under a normal input voltage, the transfer gain must stay afar from their variable extremes to allow for such dynamics.

Conventional Buck or Boost converter designs have their optimal efficiency at one extreme of their transfer gain variable range. For the Buck converter, efficiency is best at unity transfer gain, which is the maximum possible value of the Buck topology. For the Boost converter, efficiency is best (also) at unity transfer gain, which is the minimum possible value of the Boost topology. But due to the aforesaid dynamic concerns, the transfer gain cannot be set to the extreme and the efficiency is therefore far from optimal under the normal operating conditions.

There exists a Flyback converter design, which can have optimal efficiency at the middle of its transfer gain variable range. Therefore a Flyback converter can be designed with optimal efficiency under normal operating conditions. But the optimal conversion efficiency of Flyback topology is not as good as those of the Buck or Boost topologies. This is because all of the power transferred to the output must undergo a lossy electro-magnetic conversion process in a Flyback converter.

Conversely, in Buck or Boost converters, a large part of power is directly fed through to the output without undergone the same lossy process; this is particularly true at their optimal efficiency point where transfer gain is near unity. For this reason, Flyback converter is no better than Buck or Boost converters in terms of efficiency.

SUMMARY OF THE INVENTION

The object of the invention is to provide a simple DC to DC electric power conversion circuit of which the transfer gain is variable over a wide range, and the conversion efficiency is good on typical operating conditions.

In its basic form, the invention circuit has an energy storage inductor having a main winding and an auxiliary winding, as well as diodes and switches connecting to the inductor to complete the circuit. The circuit can operate in buck mode or boost mode depending on operational timing of the switches, and the circuit can seamlessly go pass from one mode to another with a continuous variation in the switches operational timing. With such a mode-transcend characteristic, the circuit is able to smoothly vary its transfer gain from zero to above unity, while maintaining an optimal efficiency at unity transfer gain.

The invention is therefore able to operate at unity transfer gain under typical working conditions, and have the transfer gain reduced or increased to cope with variations in working conditions. Optimal conversion efficiency is therefore attainable on normal operating conditions.

Under the unity transfer gain condition, a large part of power is directly fed through to the output without undergone a lossy electro-magnetic conversion process. For this reason, the optimal conversion efficiency of the invention is very good.

Due to a current-feed nature of the invention circuit, voltage stress to output diodes is very low. This enables the use of efficient low-voltage devices. Conversion efficiency is further enhanced.

DETAILED DESCRIPTION OF PREFERRED EMBODIMENTS

The electric power conversation circuit proposed by the present invention has a transfer gain which varies over a wide range from zero to beyond unity, with an optimal conversion efficiency in the mid-range. A large part of power over the circuit is transferred from input directly to the output without undergone electro-magnetic conversion. Conversion efficiency is therefore very good and such a very good efficiency is attainable under normal operating condition.

Figure 1A:
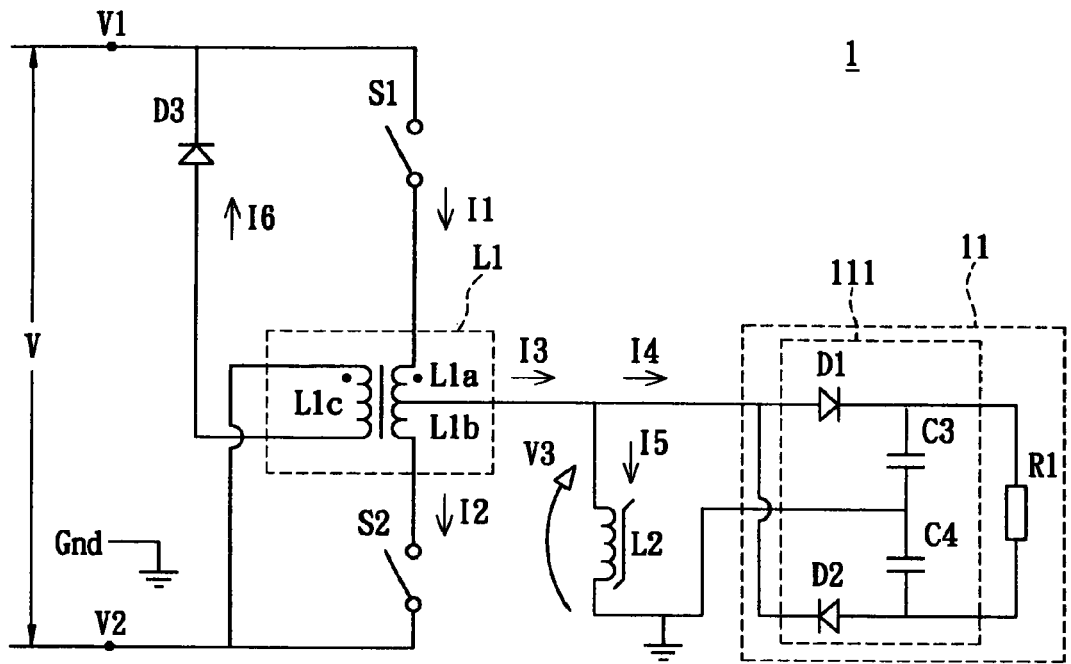
FIG. 1a is a circuit diagram for an embodiment of an electric power conversion circuit according to the present invention.

Refer to FIG. 1a, wherein a circuit diagram for an embodiment of an electric power conversion circuit according to the present invention is shown. As depicted in FIG. 1, the electric power conversion circuit 1 is powered by an input voltage source V having a positive terminal V1, a negative terminal V2, and a ground reference terminal Gnd. Circuit Block 11 represents an AC loading circuit which may contain within a rectifier circuit 111 and a DC load R1. L1 is an energy storage inductor having two main windings L1a and L1b, and an auxiliary winding L1c; these windings are magnetically coupled.

A first switch S1 connects in series with the main winding L1a to form a first switch-inductor combination, which connects the AC loading circuit 11 to the positive terminal V1 of the input voltage source V. A second switch S2 connects in series with the main winding L1b to form a second switch-inductor combination, which connects the AC loading circuit 11 to the negative terminal V2 of the input voltage source V.

When both the first and second switches S1, S2 conduct, the main windings L1a and L1b are connected across the positive and negative terminals V1, V2 of the input voltage source V, and a current represented by I1 or I2 may flow through the main windings L1a and L1b to charge magnetic energy into inductor L1. When only the first switch S1 or the second switch S2 conducts, the AC loading circuit 11 is connected to either the positive terminal V1 or the negative terminal V2 of the input voltage source V via one of the main windings of the inductor L1, and a current I3 may flow through that main winding into the AC loading circuit 11. A rectifier diode D3 connects in series with the auxiliary winding L1c of the inductor L1 to form an inductor-diode combination. The polarity of the rectifier diode D3 is so arranged that a flyback current I6 is allowed to flow when the first or second switch S1, S2 disconnects. In this embodiment, the inductor-diode combination is connected across the supply terminals of the input voltage source V, such that the flyback current may return energy to the input voltage source V. L2 is a saturable inductor connecting across the AC loading circuit 11. Its use is optional but it facilitates zero-voltage-switching under appropriate conditions.

Figure 1B:
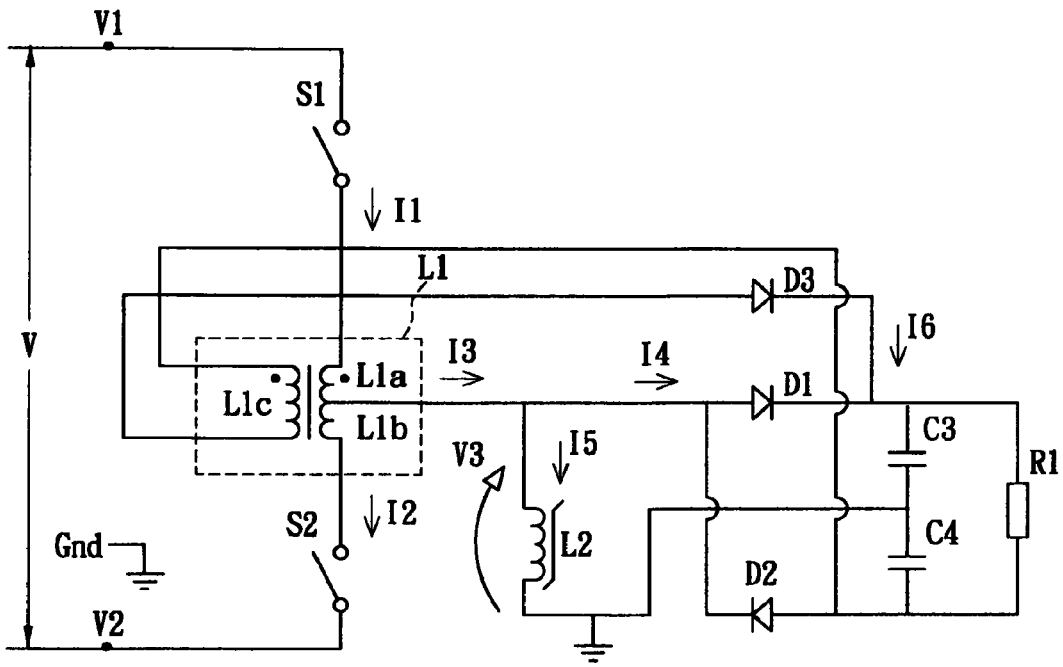
FIG. 1b is a circuit diagram for an embodiment of a variant of FIG. 1a according to the present invention.
Figure 1C:
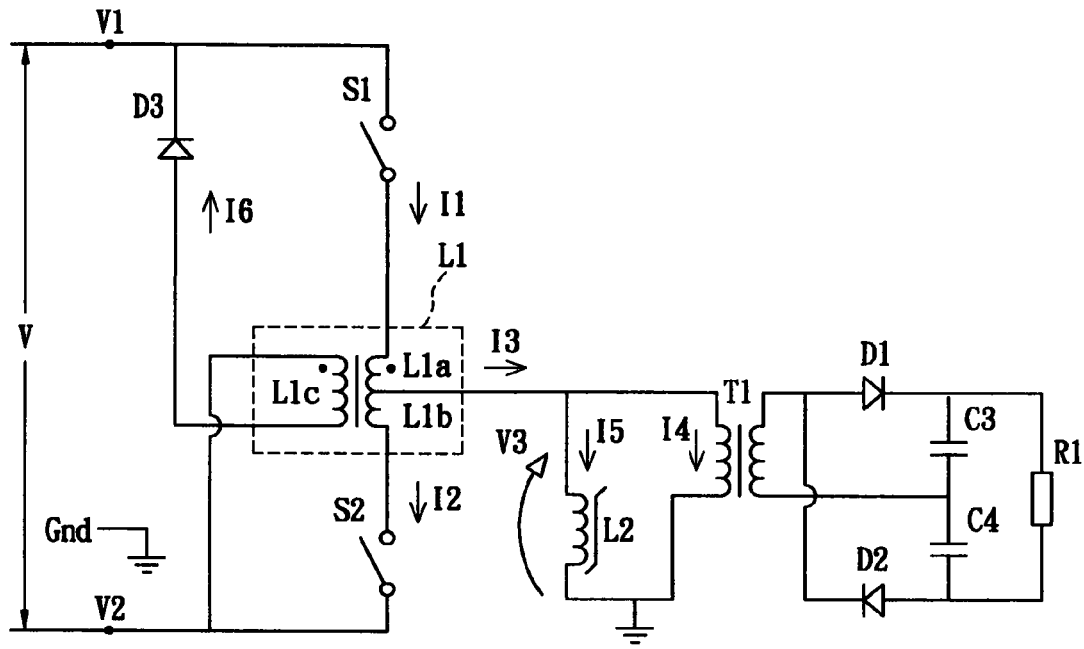
FIG. 1c is a circuit diagram for an embodiment of another variant of the FIG. 1a according to the present invention.
Figure 1D:
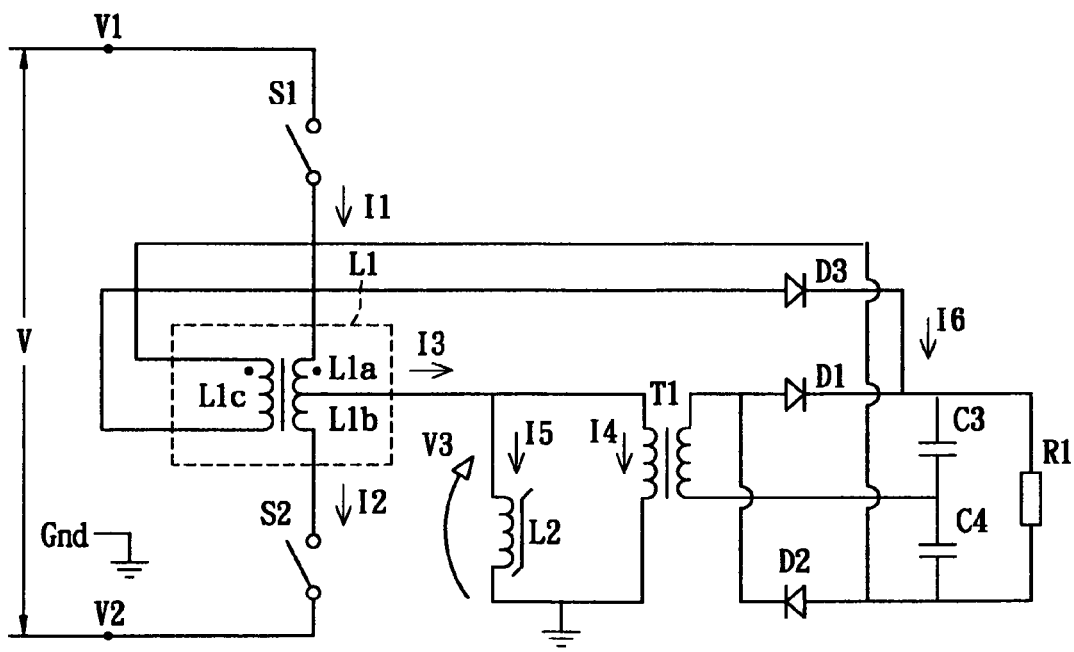
FIG. 1d is a circuit diagram for an embodiment of yet another variant of the FIG. 1a according to the present invention.

Refer in conjunction to FIGS. 1b to 1d, wherein circuit diagrams for an embodiment of variations of FIG. 1a according to the present invention are shown. FIG. 1b is similar to FIG. 1a but with the inductor-diode combination connected across the DC load R1 within the AC loading circuit 11. FIG. 1c is similar to FIG. 1a but with an isolation transformer T1 included into the AC loading circuit 11.

FIG. 1d is the preferred embodiment, which is similar to FIG. 1a but with both the inductor-diode combination connected across the DC load R1 within the AC loading circuit 11, and with the isolation transformer T1 included into the AC loading circuit 11.

Figure 2:
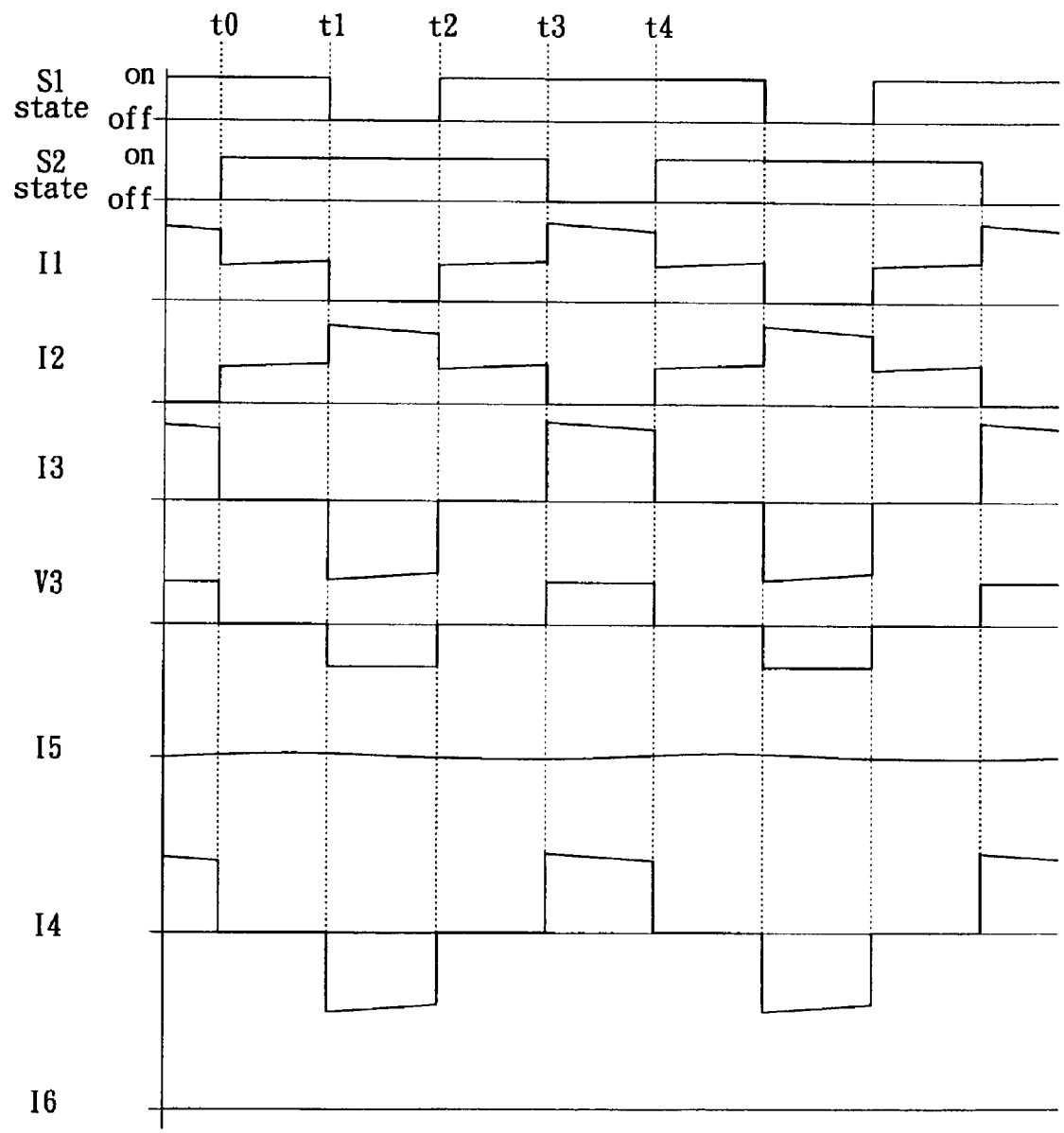
FIG. 2 is an operational waveform diagram for an embodiment of an electric power conversion circuit on high duty cycle with non-zero-voltage-switching characteristic according to the present invention.

Refer to FIG. 2, wherein an operational waveform diagram for an embodiment of an electric power conversion circuit on high duty cycle with non-zero-voltage-switching characteristic according to the present invention is shown. Refer in conjunction to the relative circuit diagrams, FIGS. 1a to 1d. Of non-zero-voltage-switching operation, we may ignore the saturable inductor L2 and its body current I5 as if L2 were omitted from the circuit; because L2 does not play an active role in this mode of operation. Of high duty cycle operation, flyback energy of the energy storage inductor L1 is absorbed by the AC loading circuit 11 and hence there is no current flowing through the auxiliary winding L1c of the energy storage inductor L1. I6 is therefore zero. Details of the operation as follow:

During a period of time from t0 to t1, both of the switches S1 and S2 are put to on state. Currents I1 and I2 are gradually increasing when they charge magnetic energy into inductor L1 through its main windings L1a and L1b. Voltage V3 across the AC loading circuit 11 is zero and so does current I4 into the AC loading circuit 11. Body current I5 of the saturable inductor L2 is negligible and so does current I3 out of a tapping terminal where the two switch-inductor combinations join.

At time t1, the first switch S1 is put to off state. The current I1 which was flowing through the first switch S1 is interrupted and inductively reflected to current I2, making current I2 stronger. Because the first switch S1 disconnected the circuit path of the main winding L1a, current I2 is forced to draw from the tapping terminal leading to a negative current I3. Current I3 is drawn from the AC loading circuit 11 making a negative output current I4. The voltage across AC loading circuit 11, V3, is therefore negative. This condition is maintained through out a time period from t1 to t2. Magnetic energy is extracted from the energy storage inductor L1, and the inductor current I2 is gradually decreasing during this period. Note that since the negative output current I4 is flowing from the negative terminal V2 of the input voltage source V through the second switch S2, a good part of power known as direct power is extracted from the input voltage source V. Such direct power has not gone through magnetic conversion and hence does not suffer from conversion loss. Overall conversion efficiency of the circuit is therefore improved.

At time t2, the first switch S1 is put back to on state. Both of the switches S1 and S2 are conducting and the waveforms and circuit operation are essentially repeating what they did during the period from t0 to t1.

At time t3, the second switch S2 is put to off state. The waveforms and circuit operation are similar to that of time t1 but with current I2 inductively reflected to current I1 and having both current I3 and I4 positive. This condition is maintained through out a time period from t3 to t4. Similar to time period t1 to t2, a direct power is extracted from the input voltage source V from the positive terminal V1 through the first switch S1. Overall conversion efficiency of the circuit is therefore improved.

At time t4, the waveforms and circuit states return to those of time t0. Subsequent operation is a cyclical perpetuation of the events from t0 to t4.

In this mode of operation, the peak voltage to the AC loading circuit 11, V3, is a sum of the input voltage source terminal voltage (at positive terminal V1 or negative terminal V2) and an inductor flyback voltage of main winding L1a or L1b. We refer this mode of operation as boost mode because it is similar to ordinary boost converters but having conversion effect alternating for both voltage polarities. Like ordinary boost converters, the transfer gain of boost mode is variable from unity to arbitrarily high.

Figure 3:
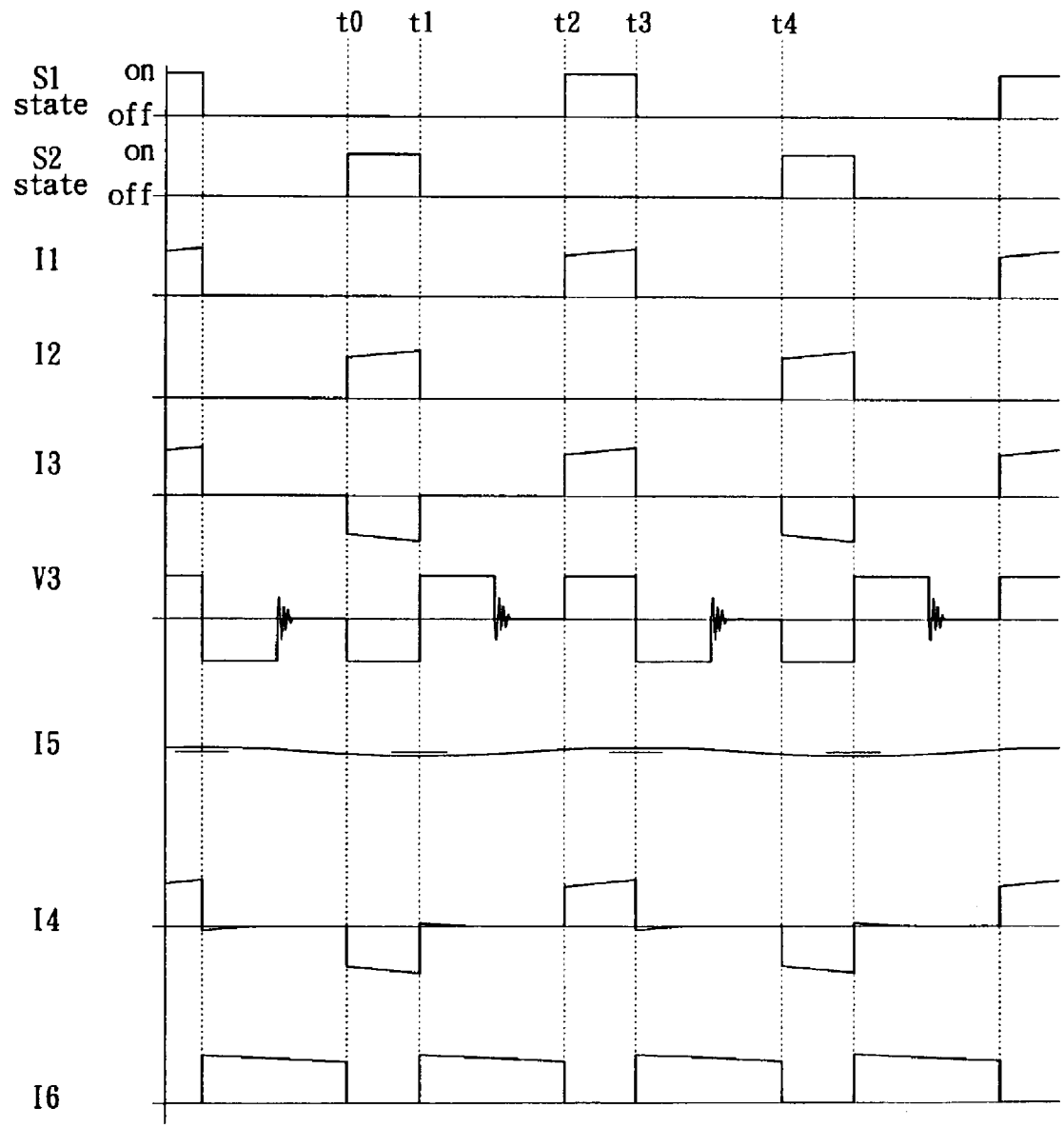
FIG. 3 is an operational waveform diagram for an embodiment of an electric power conversion circuit on low duty cycle with non-zero-voltage-switching characteristic according to the present invention.

Refer now to FIG. 3, wherein an operational waveform diagram for an embodiment of an electric power conversion circuit on low duty cycle with non-zero-voltage-switching characteristic according to the present invention is shown. Refer in conjunction to the relative circuit diagrams, FIGS. 1a to 1d. Of non-zero-voltage-switching operation, we may ignore the saturable inductor L2 and its body current I5 as if L2 were omitted from the circuit; because L2 does not play an active role in this mode of operation. Of low duty cycle operation, the switches S1 and S2 do not cross-conduct and hence flyback energy of the energy storage inductor L1 must be absorbed by a circuit connecting through rectifier diode D3 across the auxiliary winding L1c. When a DC load R1 exist (within or outside the AC loading circuit 11), it is desirable to connect the auxiliary winding L1c through the rectifier diode D3 across the DC load R1 as shown in FIGS. 1b and 1d, so that the flyback energy is forwarded to the load contributing a part of output power. But the auxiliary winding L1c and the rectifier diode D3 may also connect to the input voltage source V as shown in FIGS. 1a and 1c. Details of operation for these connections are similar:

During a period of time from t0 to t1, the first switch S1 is put to off state and the second switch S2 to on state. A negative voltage from, negative terminal V2 is applied to the AC loading circuit 11 through the second switch S2 and the energy storage inductor main winding L1b. A negative voltage, V3, is developed across the AC loading circuit 11. A current I2 is gradually increasing when it charges magnetic energy into inductor L1 through the main winding L1b. Current I3 equals negative current I2 because current I1 is cut off by the first switch S1. Current into the AC loading circuit 11, I4, essentially equals current I3 because the body current I5 of the saturable inductor L2 is negligible.

Note that the output current I4 is negative and is flowing from the negative terminal V2 of the voltage source. Direct power is transferred from the input voltage source V to the output circuit without going through magnetic conversions.

At time t1, the second switch S2 is put to off state. I2, the current flowing through the second switch S2, is interrupted and inductively reflected to the auxiliary winding L1c to form a flyback current I6. Current I3 is interrupted after current I2, and so does current I4. If a saturable inductor L2 exists, the voltage across AC loading circuit, V3, will revert to positive for a while (as shown) due to a weak voltage ring-back of the saturable inductor L2. But if the saturable inductor L2 is omitted, voltage V3 will be left floating and returning gradually to zero. This condition is sustained through out a time period from t1 to t2. Magnetic energy is extracted from the energy storage inductor L1, and the flyback current I6 is gradually decreasing during this period. If the auxiliary winding L1c is connected through rectifier diode D3 to a DC load R1 as shown in FIGS. 1b and 1d, the flyback current I6 will flow into the DC load R1 and the energy discharged from the energy storage inductor L1 be transferred to output circuit. But if the auxiliary winding L1c is connected through rectifier diode D3 to the input voltage source V as shown in FIGS. 1a and 1c, the flyback current I6 will flow to the input voltage source V and energy discharged from inductor L1 be transferred back to the input circuit.

At time t2, the first switch S1 is put to on state. A positive voltage from positive terminal V1 is applied to the AC loading circuit 11 through S1 and the energy storage inductor main winding L1a. A positive voltage V3 is developed across the AC loading circuit 11. Current I1 is gradually increasing when it charges magnetic energy into the inductor L1 through the main winding L1a. Current I3 equals I1 because current I2 is cut off by the second switch S2. Current into the AC loading circuit 11, I4, essentially equals current I3 because the body current I5 of the saturable inductor L2 is negligible. This condition is sustained through out a time period from t2 to t3. Similar to that of time period from t0 to t1, output current I4 is flowing from the positive terminal V1 of the voltage source; direct power is transferred from the input voltage source V to the output circuit without going through magnetic conversions.

At time t3, the first switch S1 is put to off state. I1, the current flowing through S1, is interrupted and inductively reflected to the auxiliary winding L1c to form a flyback current I6. Current I3 is interrupted after current I1, and so does current I4. If a saturable inductor L2 exists, the voltage across AC loading circuit 11, V3, will revert to negative for a while (as shown) due to a weak voltage ring-back of the saturable inductor L2. But if the saturable inductor L2 is omitted, the voltage V3 will be left floating and returning gradually to zero. This condition is sustained through out a time period from t3 to t4. The remaining details are similar to that of the time period from t1 to t2.

At time t4, the waveforms and circuit states return to those of t0. Subsequent operation is a cyclical perpetuation of the events from t0 to t4.

In this mode of operation as above, the charging current for energy storage inductor, I1 or I2, flows through a loading circuit. We refer this mode of operation as buck mode because it is similar to ordinary buck converters. For embodiments shown in FIGS. 1b and 1d, even the inductor flyback current I6 flows into the DC load R1, making them genuine buck converters but having conversion alternating on both voltage polarities. Like ordinary buck converters, transfer gain of the basic embodiment shown in FIG. 1b is variable from 0 to unity.

Refer again to FIGS. 1a, 1b, 1c, 1d, 2 and 3, with proper operating sequences for the switches, the invention can operate in either boost or buck mode. Transfer gain can be variable seamlessly from zero to above unity. Like boost or buck converters, on unity transfer gain the efficiency is very high because all output power is fed directly from the input without undergone electro-magnetic conversions. The invention is hence set to operate at unity transfer gain under normal working conditions. When the working condition varies, the invention may change to boost or buck mode to increase or reduce its transfer gain.

Note that in cases where a DC load exists, a rectifier circuit such as that composed with diodes D1, D2, and capacitors C3, C4, in FIGS. 1b and 1d is used to convert the AC load current, I4, into DC. Due to this current-feed nature, voltage stress to the rectifier diodes is very low. That enables the use of efficient low-voltage-dropout devices. The conversion efficiency of the invention especially under unity transfer gain condition is further improved.

Figure 4:
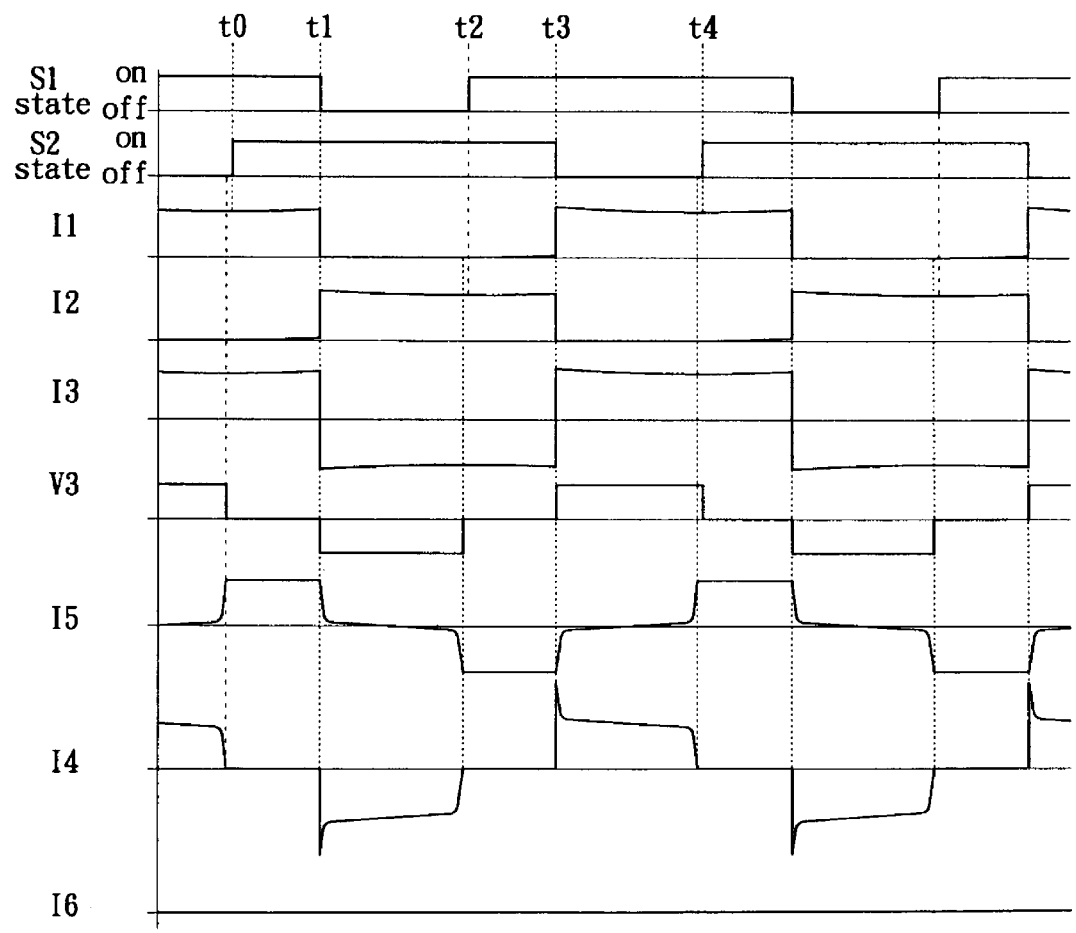
FIG. 4 is an operational waveform diagram for an embodiment of an electric power conversion circuit on high duty cycle with zero-voltage-switching characteristic according to the present invention.

Refer to FIG. 4, wherein an operational waveform diagram for an embodiment of an electric power conversion circuit in boost-mode with zero-voltage-switching characteristic according to the present invention is shown. Labels used here are common with those of FIGS. 1a to 1d and FIGS. 2 to 3. Zero-voltage-switching is achieved with saturable inductor L2. When switches S1 and S2 are operated such that time periods from t1 to t2 and from t3 to t4 are maintained for sufficiently long, the saturable inductor L2 is saturated by its terminal voltage V3. When L2 saturates, it shunts the AC loading circuit 11 by absorbing all of the current I3 in to its body current I5, leaving no current for current I4. The tapping terminal voltage V3 is therefore brought to zero. This change in tapping terminal voltage is inductively reflected to the end terminal of a main winding, L1a or L1b of the energy storage inductor L1, bringing the contact voltage of the non-conducting switch, S1 or S2, to zero. The non-conducting switch is then put to conduction. Because the switch is turned on with zero voltage across its contacts, there is no switching loss. The total loss of the converter circuit is reduced and the conversion efficiency is therefore increased. Details of the waveforms as follow:

During a period of time from t0 to t1, both of the switches S1 and S2 are put to on state. Currents I1 and I2 are gradually increasing when they charge magnetic energy into the inductor L1 through its main windings L1a and L1b. Current I2 is very low because most of the current I1 is absorbed by the saturable inductor L2 as its body current I5. Because of circuit symmetry, voltage across the AC loading circuit 11, V3, is zero and hence no current I4 is driven into the AC loading circuit 11. The body current I5 of the saturable inductor L2 is sustained at a constant level and so does current I3.

At time t1, the first switch S1 is put to off state. I1, the current flowing through S1, is interrupted and inductively reflected to current I2. Because the first switch S1 disconnected the circuit path of the main winding L1a, current I2 is forced to draw from the tapping terminal leading to a negative current I3. I3 is now drawn from the AC loading circuit 11 making a negative output current at I4. The voltage across AC loading circuit, V3, is therefore negative. Current I5 decays rapidly due to the negative voltage V3. Current I5 transfers also to current I4 making a negative current spike there. Magnetic energy is extracted from the energy storage inductor L1, and the inductor current I2 gradually decreases. Current I5 is gradually turning to negative due to negative voltage at V3. Current I3 is reducing following current I2; and current I4 is reducing as well following I3 and I5.

Note that since the negative output current I4 is flowing from the negative terminal V2 of the voltage source through the second switch S2, a good part of power known as direct power is extracted from the input voltage source V. Such direct power has not gone through magnetic conversion and hence does not suffer from conversion loss. Overall conversion efficiency of the circuit is therefore improved.

This condition is maintained for a while until the saturable inductor L2 is saturated by negative voltage V3. As this happens, current I5 goes rapidly negative and absorbs all of the current I3, leaving no current for I4. Voltage at the tapping terminal, V3, is brought to zero. This voltage change is inductively reflected to the first switch S1 at an end terminal of the energy storage inductor L1, bringing the voltage across the first switch S1 to zero.

At time t2, soon after the saturable inductor L2 saturates, the first switch S1 is put back to on state. Because the voltage across the first switch S1 was zero, there is no switching loss associated with this operation. During a time period from t2 to t3, both of the switches S1 and S2 are conducting at this time. Currents I1 and I2 are gradually increasing when they charge magnetic energy into inductor L1 through its main windings L1a and L1b. Current I1 is very low because most of the current I1 is cancelled by the negative current I5 from the saturable inductor L2. Because of circuit symmetry, voltage across the AC loading circuit 11, V3, is zero and hence no current, I4, is driven into the AC loading circuit 11. The body current I5 of the saturable inductor L2 is sustained at a constant level and so does current I3.

At time t3, the second switch S2 is put to off state. I2, the current flowing through the second switch S2, is interrupted and inductively reflected to current I1. Because S2 disconnected the circuit path of the main winding L1b, current I1 is forced out of the tapping terminal as current I3. Current I3 is now supplying the AC loading circuit 11 making a positive output current at I4. The voltage across AC loading circuit 11, V3, is therefore positive. Current I5 decays rapidly due to the positive voltage V3. Current I5 transfers also to current I4 making a positive current spike there. Magnetic energy is extracted from the energy storage inductor L1, and the inductor current I1 gradually decreases. I5 is gradually turning to positive due to positive voltage at V3. Current I3 is reducing following current I1; and current I4 is reducing as well following current I3 and I5.

Similar to time period t1 to t2, a direct power is extracted from the input voltage source V from the positive terminal V1 through the first switch S1. Overall conversion efficiency of the circuit is therefore improved.

This condition is maintained for a while until the saturable inductor L2 is saturated by positive voltage V3. As this happens, current I5 goes rapidly positive and absorbs all of the current I3, leaving no current for I4. Voltage at the tapping terminal, V3, is brought to zero. This voltage change is inductively reflected to the second switch S2 at an end terminal of the energy storage inductor L1, bringing the voltage across the second switch S2 to zero.

At time t4, soon after the saturable inductor L2 saturates, the second switch S2 is put back to on state. Because the voltage across the first switch S1 was zero, there is no switching loss associated with this operation. From this time onward, the waveforms and circuit states return to those of t0. Subsequent operation is a cyclical perpetuation of the events from time t0 to t4.

Figure 5:
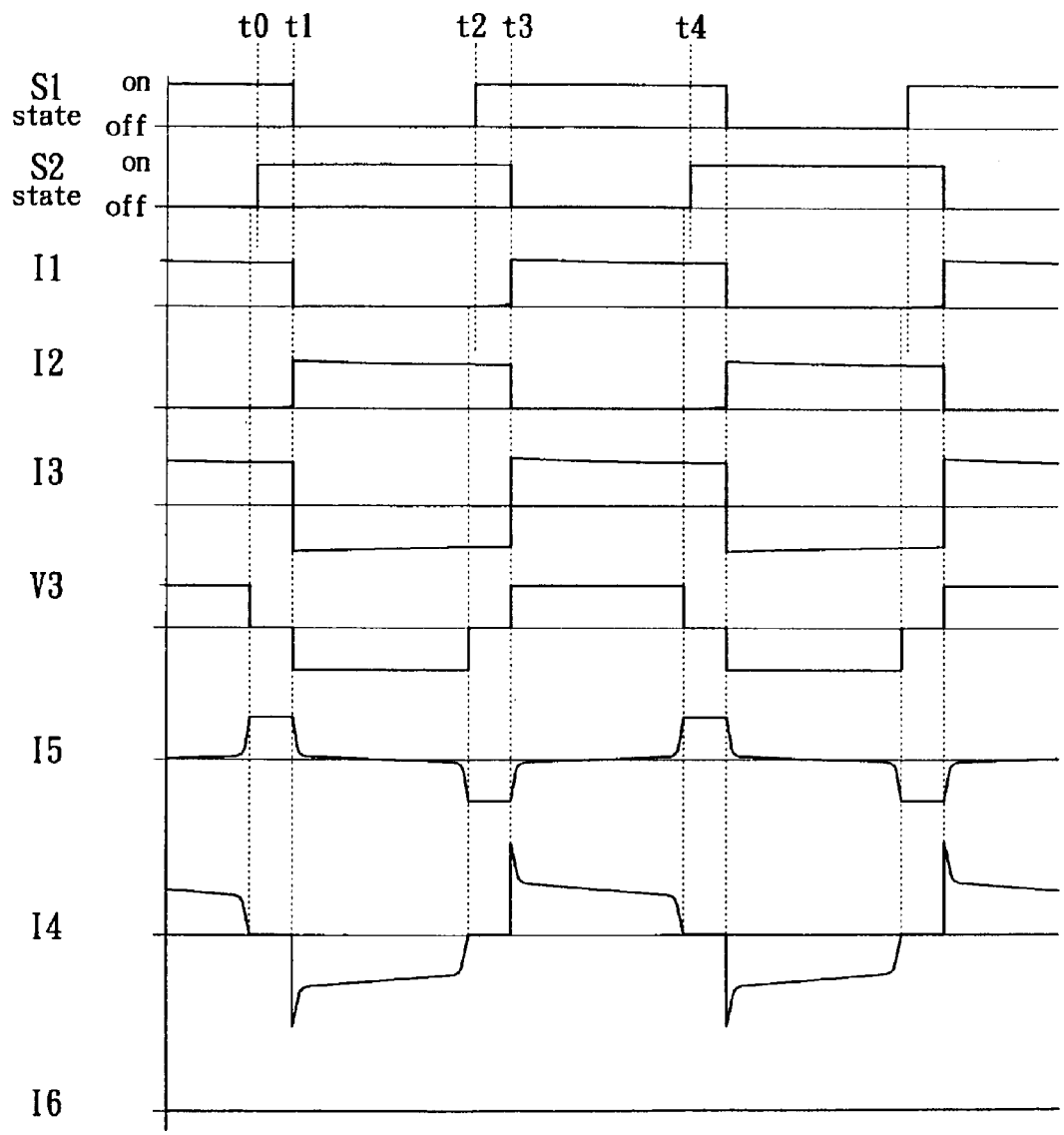
FIG. 5 is an operational waveform diagram for an embodiment of an electric power conversion circuit on moderate duty cycle with zero-voltage-switching characteristic according to the present invention.

Refer to FIG. 5, wherein an operational waveform diagram for an embodiment of an electric power conversion circuit in boost-mode with a lower switch conduction duty-cycle and zero-voltage-switching characteristic according to the present invention is shown. It is essentially the same as FIG. 4 except for the lower duty-cycle. Notwithstanding a lower duty-cycle, the time periods from t1 to t2 and from t3 to t4 remain sufficiently long for the zero-voltage-switching operation.

We have described in detail some basic embodiments of the invention above. There are variations of the invention which are topologically equivalent or similar to the above embodiments and they operate on the same principle.

Figure 6A:
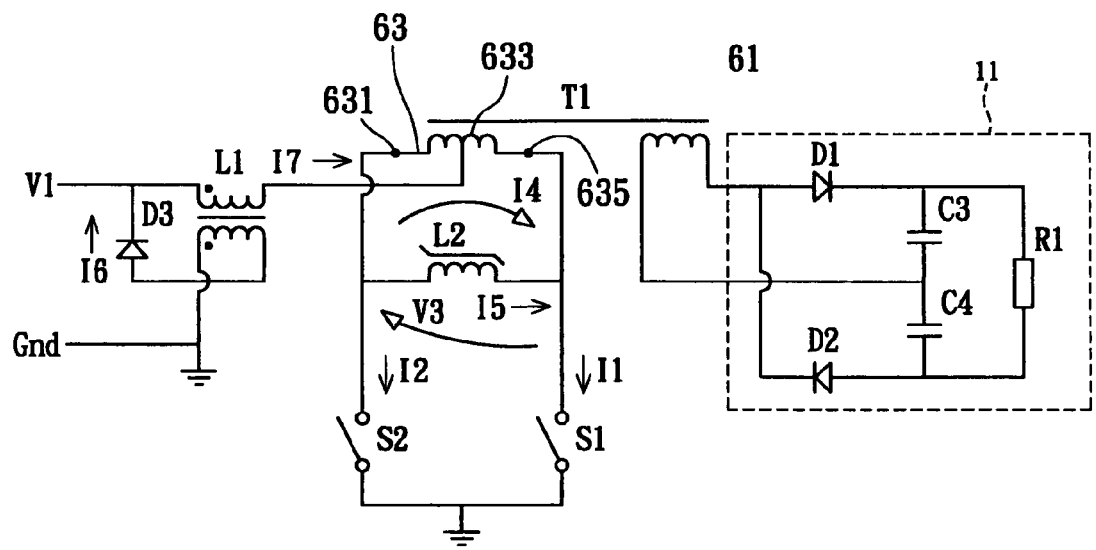
FIG. 6a is a circuit diagram for another embodiment of an electric power conversion circuit according to the present invention.
Figure 6B:
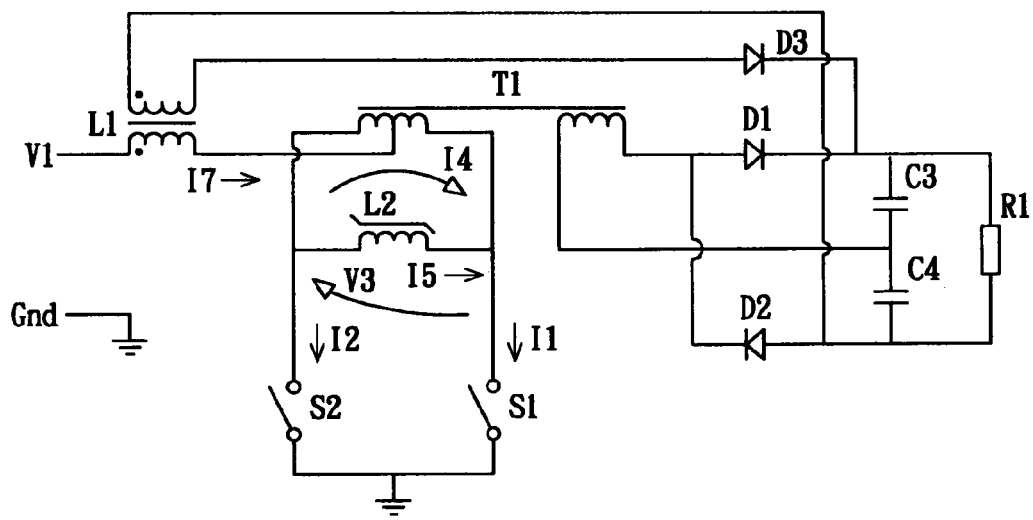
FIG. 6b is a circuit diagram for an embodiment of a variant of FIG. 6a according to the present invention.

Refer to FIGS. 6a and 6b, wherein circuit diagrams for another alternative embodiment of an electric power conversion circuit according to the present invention is shown. These embodiments use a tapped transformer T1 instead of a tapped (or a twin main-winding) energy storage inductor L1. The transformer T1 has a secondary winding 61 and a primary winding 63, wherein the primary winding 63 contains a first end terminal 631, a second end terminal 635 and a tapping terminal 633. The AC loading circuit 11 connects across the secondary winding 61, and the inductor L1 connects in series between the tapping terminal 633 and the supply terminal V1. Their operation is similar to those of the FIGS. 1c and 1d, and can be explained with reference to FIGS. 7 and 8.

Figure 7:
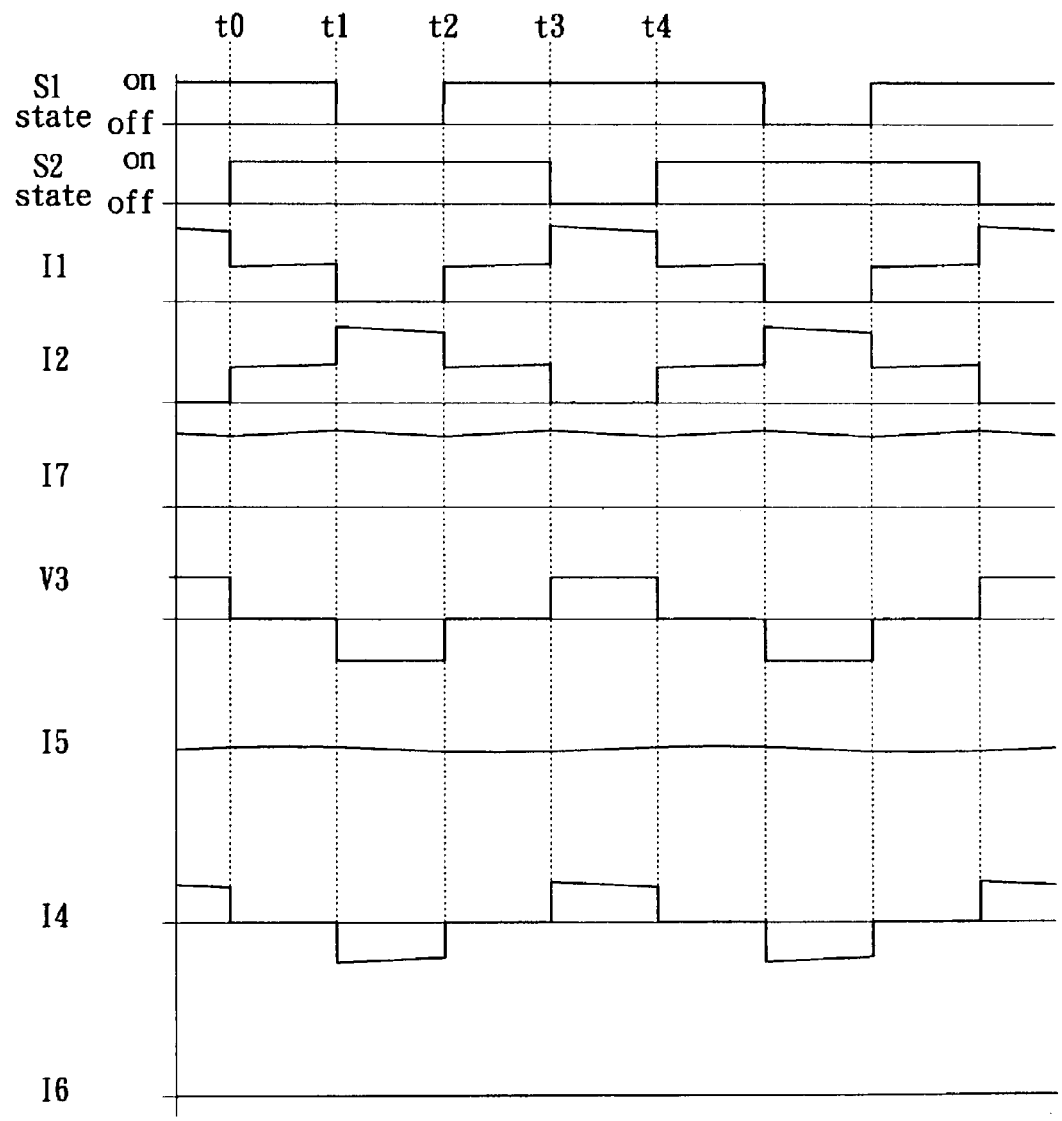
FIG. 7 is an operational waveform diagram for the embodiments of FIGS. 6a and 6b on high duty cycle with non-zero-voltage-switching characteristic according to the present invention.
Figure 8:
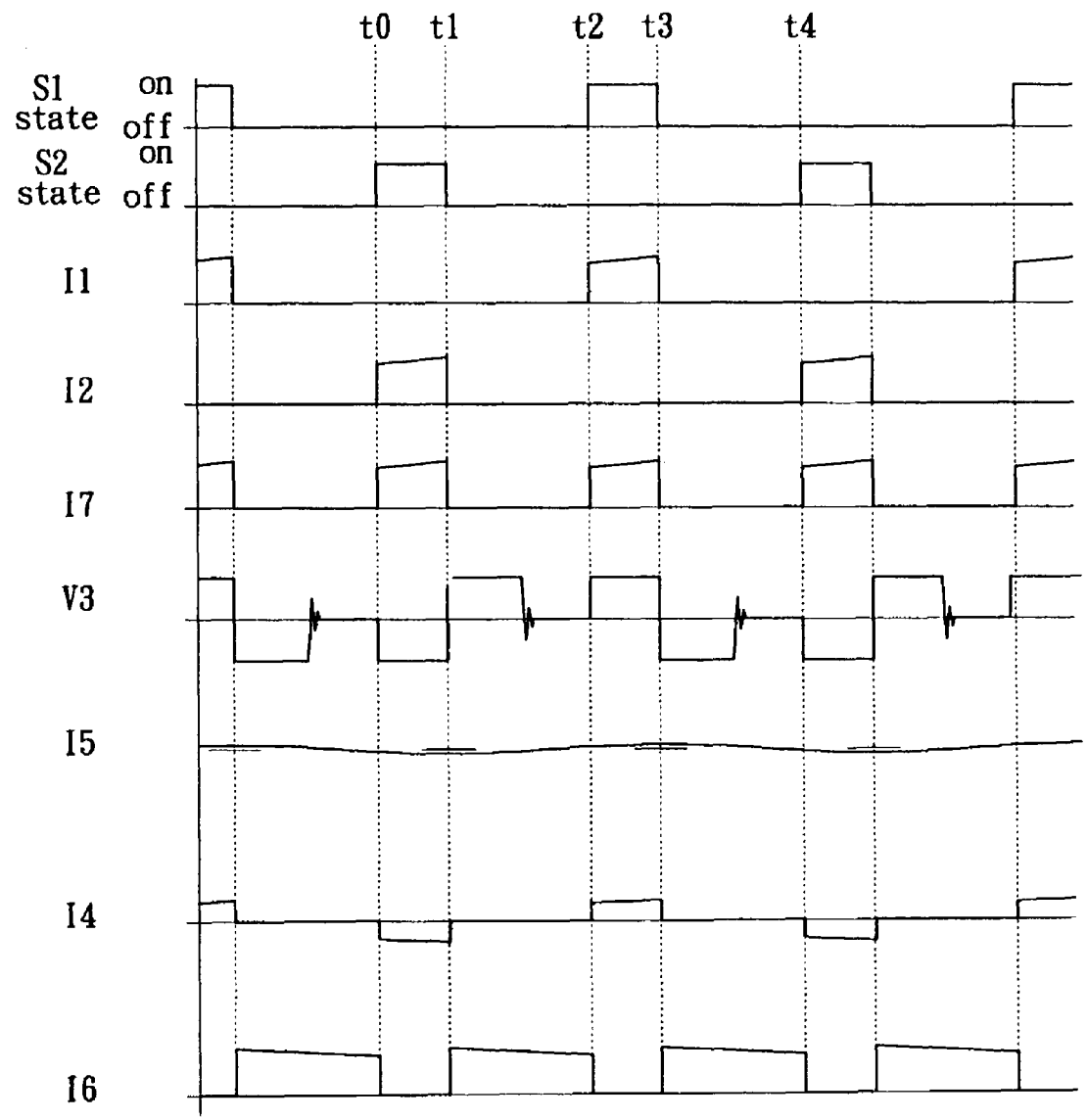
FIG. 8 is an operational waveform diagram for the embodiments of FIGS. 6a and 6b on low duty cycle with non-zero-voltage-switching characteristic according to the present invention.

Refer now to FIGS. 7 and 8, wherein operational waveform diagrams for an embodiment of an electric power conversion circuit with non-zero-voltage-switching characteristic according to the present invention is shown. Of non-zero-voltage-switching operation, we may ignore the saturable inductor L2 and its body current I5 as if the saturable inductor L2 were omitted from the circuit; because the saturable inductor L2 does not play an active role in this mode of operation.

Refer to FIG. 7, wherein an operational waveform diagram for an embodiment of an electric power conversion circuit on high duty cycle with non-zero-voltage-switching characteristic according to the present invention is shown. Of high duty cycle operation, flyback energy of the energy storage inductor L1 is absorbed by the AC loading circuit 11 and hence there is no current flowing through the auxiliary winding (which D3 connects) of the energy storage inductor L1. I6 is therefore zero. Details of the operation as follow:

During a period of time from t0 to t1, both of the switches S1 and S2 are put to on state. Currents I1 and I2 are gradually increasing when they combine into current I7 and charge magnetic energy into inductor L1 through its, main winding. Voltage V3, which is to be transformed to the AC loading circuit 11, is shunted by the switches S1 and S2 and therefore zero. Current I4, which is to be transformed to the AC loading circuit 11, is also zero. The body current I5 of the saturable inductor L2 is negligible.

At time t1, the first switch S1 is put to off state. I1, the current flowing through the first switch S1, is interrupted and the totality of the current I7 of the energy storage inductor L1 is forced into current I2, making I2 stronger. The difference of currents I2 and I1 formed a negative magnetizing current, I4. The voltage V3 is therefore also negative. This condition is maintained through out a time period from t1 to t2. Magnetic energy is extracted from the energy storage inductor L1, and the inductor current I2 is gradually decreasing during this period.

Note that the negative current I4 is essentially driven by current I7 through the second switch S2, which is flowing from the supply terminal V1 of a voltage source. Direct power is extracted from the input voltage source V.

At time t2, the first switch S1 is put back to on state. Both of the switches S1 and S2 are conducting and the waveforms and circuit operation are essentially repeating what they did during the period from t0 to t1.

At time t3, the second switch S2 is put to off state. The waveforms and circuit operation are similar to that of time t1 but with the totality of current I7 forced into current I1 and have both current I4 and voltage V3 positive. Likewise, this condition is maintained through out a time period from t3 to t4. Similar to time period t1 to t2, direct power is extracted from the input voltage source V.

At time t4, the waveforms and circuit states return to those of time t0. Subsequent operation is a cyclical perpetuation of the events from time t0 to t4.

Refer to FIG. 8, wherein an operational waveform diagram for an embodiment of an electric power conversion circuit on low duty cycle with non-zero-voltage-switching characteristic according to the present invention is shown. Of low duty cycle operation, the switches S1 and S2 do not cross-conduct and hence flyback energy of the energy storage inductor L1 must be absorbed by a circuit connecting through the rectifier diode D3 across the auxiliary winding of inductor L1. When a DC load R1 exist (within or outside the AC loading circuit 11), it is desirable to connect the auxiliary winding of inductor L1 through the rectifier diode D3 across the DC load R1 as shown in FIG. 6b, so that the flyback energy is forwarded to the load contributing a part of output power. But the auxiliary winding and the rectifier diode D3 may also connect to the input voltage source as shown in FIG. 6a. Details of operation for these connections are similar:

During a period of time from t0 to t1, the first switch S1 is put to off state and the second switch S2 to on state. A voltage from the supply terminal V1 is applied to the AC loading circuit 11 through the energy storage inductor L1 main winding, transformer T1, and the second switch S2. A negative voltage V3 is developed and to be transformed to the AC loading circuit 11. Current I2, which is essentially current I7, is increasing gradually when it charges magnetic energy into inductor L1. Current to be transformed to the AC loading circuit 11, I4, is negative but essentially assumes the waveform of current I7 because the body current I5 of the saturable inductor L2 is negligible. Note that the current I4 is flowing from the supply terminal V1 of the voltage source. Direct power is transferred from the input voltage source to the output circuit without going through magnetic conversions.

At time t1, the second switch S2 is put to off state. I2, the current flowing through the second switch S2, is interrupted. Current I7 is interrupted after current I2, and so does current I4. The interruption of current I7 is inductively reflected to the auxiliary winding of the inductor L1 to form a flyback current I6. If a saturable inductor L2 exists, the voltage to be transformed to AC loading circuit 11, V3, will revert to positive for a while (as shown) due to a weak voltage ring-back of the saturable inductor L2. But if the saturable inductor L2 is omitted, V3 will gradually return to zero. This condition is sustained through out a time period from time t1 to t2. Magnetic energy is extracted from the energy storage inductor L1, and the flyback current I6 is gradually decreasing during this period. If the auxiliary winding of the inductor L1 is connected through the rectifier diode D3 to a DC load R1 as shown in FIG. 6b, the flyback current I6 will flow into the DC load R1 and the energy discharged from the energy storage inductor L1 be transferred to output circuit. But if the auxiliary winding is connected through the rectifier diode D3 to the input voltage source as shown in FIG. 6a, the flyback current I6 will flow to the input voltage source and energy discharged from the inductor L1 be transferred back to the input circuit.

At time t2, the first switch S1 is put to on state. Voltage from the supply terminal V1 is applied to the AC loading circuit 11 through the energy storage inductor L1 main winding, transformer T1, and the first switch S1. A positive voltage V3 is developed and to be transformed to the AC loading circuit 11. Current I1, which is essentially current I7, is increasing gradually when it charges magnetic energy into the inductor L1. Current to be transformed to the AC loading circuit 11, I4, is positive and essentially assumes the waveform of current I7 because the body current I5 of the saturable inductor L2 is negligible. This condition is sustained through out a time period from time t2 to t3. Similar to that of time period from time t0 to t1, current to be transformed to the AC loading circuit 11, I4, is flowing from the supply terminal V1 of the voltage source, some direct power is transferred from the input voltage source to the output circuit without going through magnetic conversions.

At time t3, the first switch S1 is put to off state. I1, the current flowing through the first switch S1, is interrupted. Current I7 is interrupted after current I1, and so does current I4. The interruption of current I7 is inductively reflected to the auxiliary winding of the inductor L1 to form a flyback current I6. If a saturable inductor L2 exists, the voltage to be transformed to AC loading circuit 11, V3, will revert to negative for a while (as shown) due to a weak voltage ring-back of the saturable inductor L2. But if the saturable inductor L2 is omitted, voltage V3 will gradually return to zero. This condition is sustained through out a time period from time t3 to t4. Other circuit operational details are similar to those of the time period from time t1 to t2.

At time t4, the waveforms and circuit states return to those of time t0. Subsequent operation is a cyclical perpetuation of the events from time t0 to t4.

Figure 9:
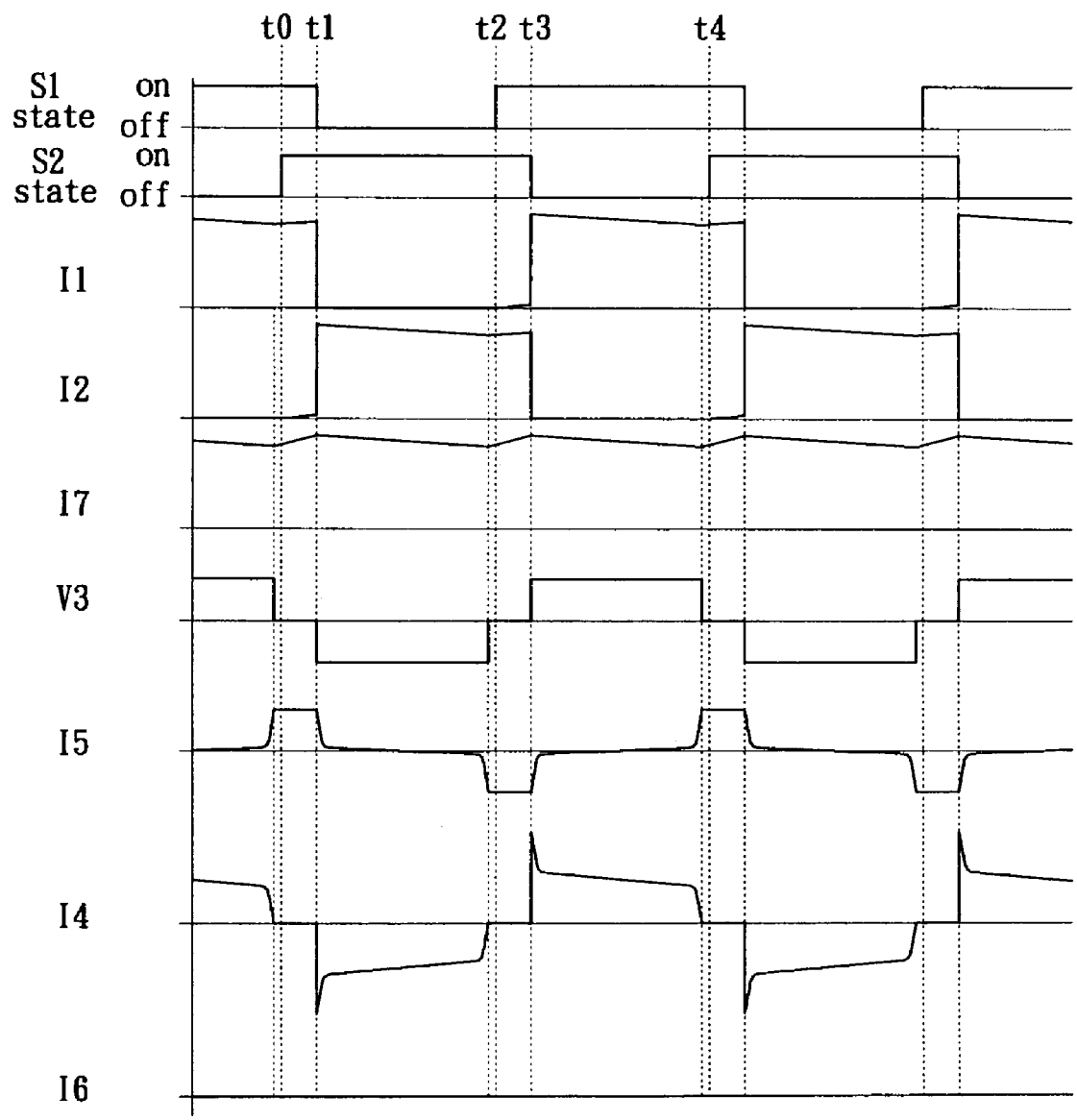
FIG. 9 is an operational waveform diagram for the embodiments of FIGS. 6a and 6b with zero-voltage-switching characteristic according to the present invention.

Refer to FIG. 9, wherein an operational waveform diagram for an embodiment of an electric power conversion circuit with zero-voltage-switching characteristic according to the present invention is shown. Zero-voltage-switching is achieved with saturable inductor L2. When switches S1 and S2 are operated such that time periods from time t1 to t2 and from t3 to t4 are maintained for sufficiently long, the saturable inductor L2 is saturated by its terminal voltage, V3. When the saturable inductor L2 saturates, it shunts the AC loading circuit 11 by absorbing all of the current I7 through the transformer T1 in to its body current I5, leaving no current for I4. The switches S1 and S2 are effectively put to parallel and the contact voltage of the non-conducting switch, be it S1 or S2, is brought to zero as that of the conducting one. The non-conducting switch is then put to conduction. Because the switch is turned on with zero voltage across its contacts, there is no switching loss. The total loss of the converter circuit is reduced and the conversion efficiency is therefore increased.

Note that the saturable inductor L2 can also be connected across the AC loading circuit 11 though it was shown to connect across the primary winding of the transformer T1 in FIGS. 6a and 6b. Due to mutual magnetic coupling, a saturable inductor L2 can be connected across any winding of the transformer T1 with the same effect. Details of the waveforms as follow:

During a period of time from t0 to t1, both of the switches S1 and S2 are put to on state. Currents I1 and I2 are gradually increasing when they combine into current I7 and charge magnetic energy into the inductor L1 through its main winding. Current I2 is very low because most of the available current is absorbed by the saturable inductor L2 into its body current I5. Because of a saturated L2, voltage across windings of the transformer T1 is zero and hence no net magnetizing current, I4, is to be driven into the AC loading circuit 11. The body current I5 of the saturable inductor L2 is sustained at a constant level during this period.

At time t1, the first switch S1 is put to off state. I1, the current flowing through the first switch S1, is interrupted and the totality of energy storage inductor current I7 is forced into current I2. The difference of current I2 and I1 formed a negative magnetizing current I4 to be transformed to the AC loading circuit 11. Voltage across the AC loading circuit 11 is reflected through transformer T1 as a negative V3 across the saturable inductor L2, taking L2 out of saturation and causing its body current I5 to decay rapidly. Current I5 transfers also to current I4 making a negative current spike there.

Magnetic energy is extracted from the energy storage inductor L1, and the inductor current I7 gradually decreases. Current I5 is gradually turning to negative due to a negative voltage V3. Current I2 is reducing following current I7; and current I4 is reducing as well following currents I7 and I5. Note that the negative current I4 is essentially driven by current I7 through the second switch S2, which is flowing from the supply terminal V1 of a voltage source, direct power is extracted from the input voltage source.

This condition is maintained for a while until the saturable inductor L2 is saturated again by the negative voltage V3. As this happens, current I5 goes rapidly negative and absorbs all of the magnetizing current, leaving no current for I4 and taking voltage V3 to zero. The switches S1 and S2 are put to parallel and the voltage across the first switch S1 is brought to zero.

At time t2, soon after the saturable inductor L2 saturates, the first switch S1 is put back to on state. Because the voltage across the first switch S1 was zero, there is no switching loss associated with this operation. During a time period from t2 to t3, both of the switches S1 and S2 are conducting. Currents I1 and I2 are gradually increasing when they combine into current I7 and charge magnetic energy into the inductor L1 through its main winding. Current I1 is very low because most of the available current is absorbed by the saturable inductor L2 into its negative body current I5. Because of a saturated L2, voltage across windings of the transformer T1 is zero and hence no net magnetizing current, I4, is to be driven into the AC loading circuit 11. The body current I5 of the saturable inductor L2 is sustained at a constant level during this period.

At time t3, the second switch S2 is put to off state. I2, the current flowing through the second switch S2, is interrupted and the totality of energy storage inductor current I7 is forced to current I1. The difference of current I2 and I1 formed a positive magnetizing current I4 to be transformed to the AC loading circuit 11. Voltage across the AC loading circuit 11 is reflected through transformer T1 as a positive voltage V3 across the saturable inductor L2, taking L2 out of saturation and causing its body current I5 to decay rapidly. Current I5 transfers also to current I4 making a positive current spike there.

Magnetic energy is extracted from the energy storage inductor L1, and the inductor current I7 gradually decreases. Current I5 is gradually turning to positive due to a positive voltage V3. Current I1 is reducing following current I7; and current I4 is reducing as well following current I7 and I5.

Similar to time period t1 to t2, a direct power is extracted from the input voltage source. This condition is maintained for a while until the saturable inductor L2 is saturated again by the positive voltage V3. As this happens, current I5 goes rapidly positive and absorbs all of the magnetizing current, leaving no current for I4 and taking voltage V3 to zero. The switches S1 and S2 are put to parallel and the voltage across the second switch S2 is brought to zero.

At time t4, soon after the saturable inductor L2 saturates, the second switch S2 is put back to on state. Because the voltage across the first switch S1 was zero, there is no switching loss associated with this operation. From this time onward, the waveforms and circuit states return to those of time t0. Subsequent operation is a cyclical perpetuation of the events from time t0 to t4.

Figure 10A:
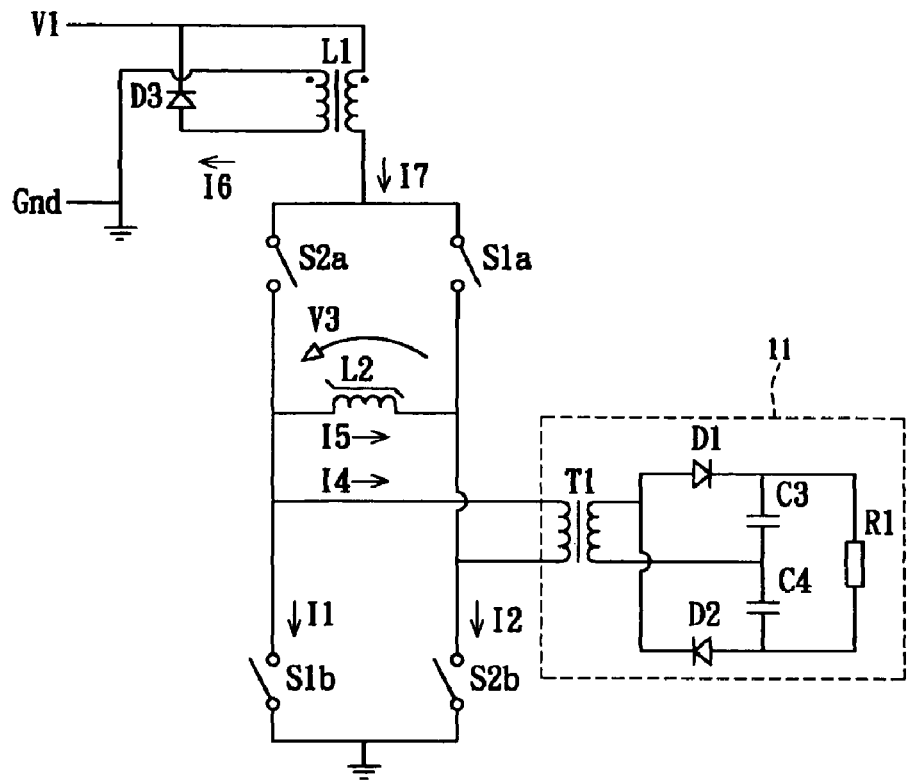
FIG. 10a is a circuit diagram for yet another embodiment of an electric power conversion circuit according to the present invention.
Figure 10B:
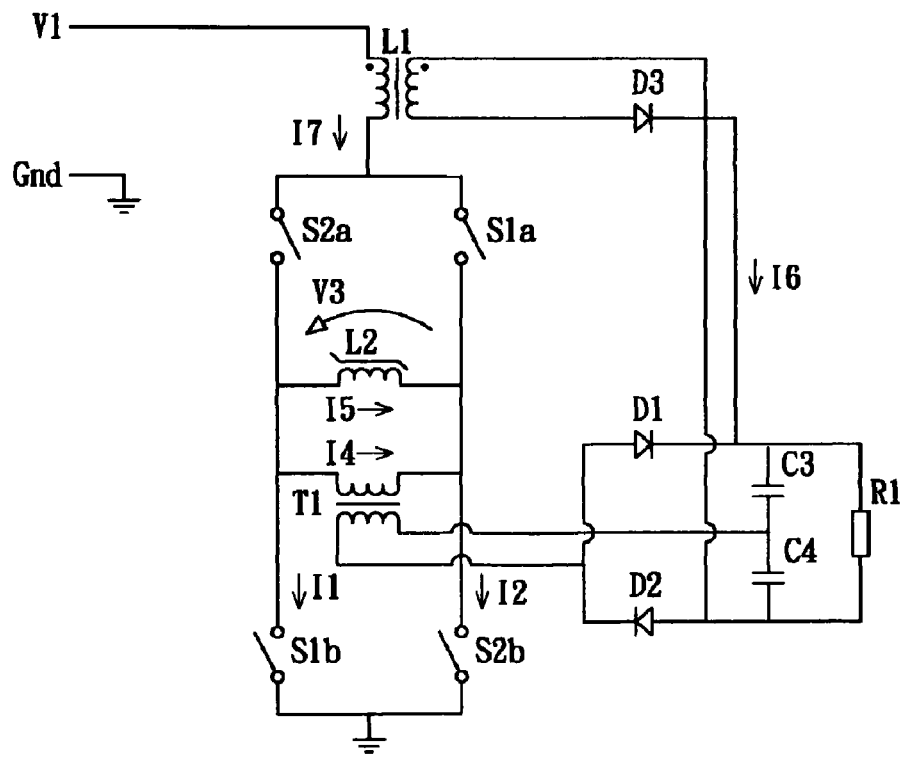
FIG. 10b is a circuit diagram for an embodiment of a variant of FIG. 10a according to the present invention.

Refer to FIGS. 10a and 10b, wherein variants of FIGS. 6a and 6b are shown. In FIGS. 10a and 10b, instead of tapping the transformer T1, two additional switches, S1a and S2a, are introduced along with the existing ones, S1b and S2b. The switches S1a and S1b formed a pair, S1a/b, and they are to switch ON or OFF at the same time. The switches S2a and S2b formed another pair, S2a/b, and they are both to switch ON or OFF at the same time as well. With these two switch pairs connecting in a bridge manner as shown in FIGS. 10a and 10b, the circuit operation is very similar to those of FIGS. 6a and 6b and can be explained the same way with reference to FIGS. 7, 8, and 9 by changing all references of switch S1 to switch pair S1a/b and those of switch S2 to switch pair S2a/b.

Figure 10C:
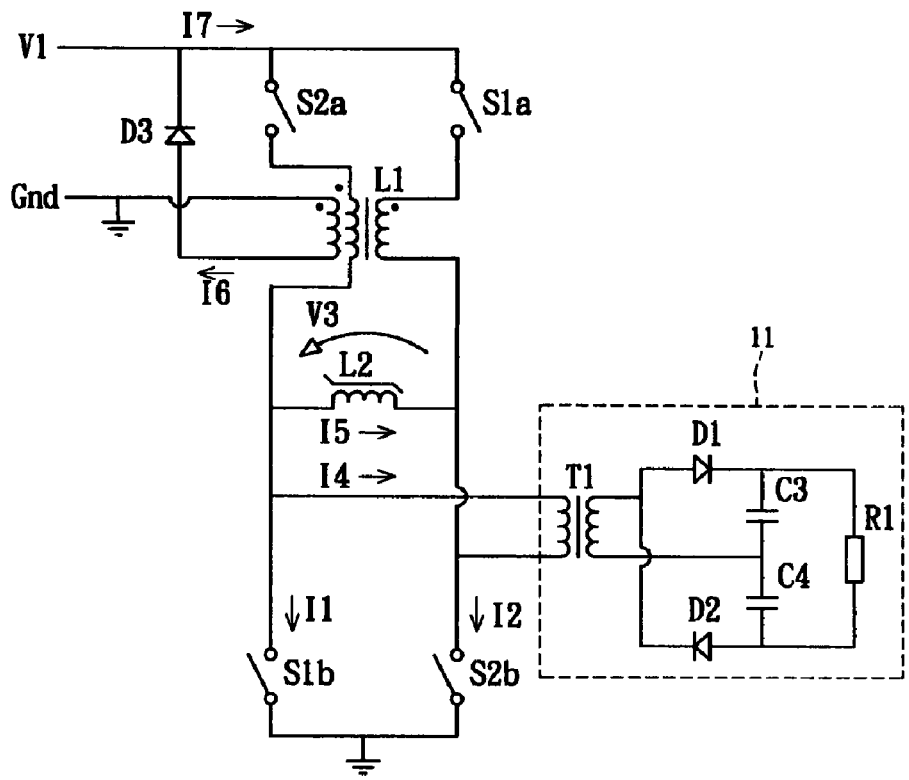
FIG. 10c is a circuit diagram for an embodiment of another variant of the FIG. 10a according to the present invention.
Figure 10D:
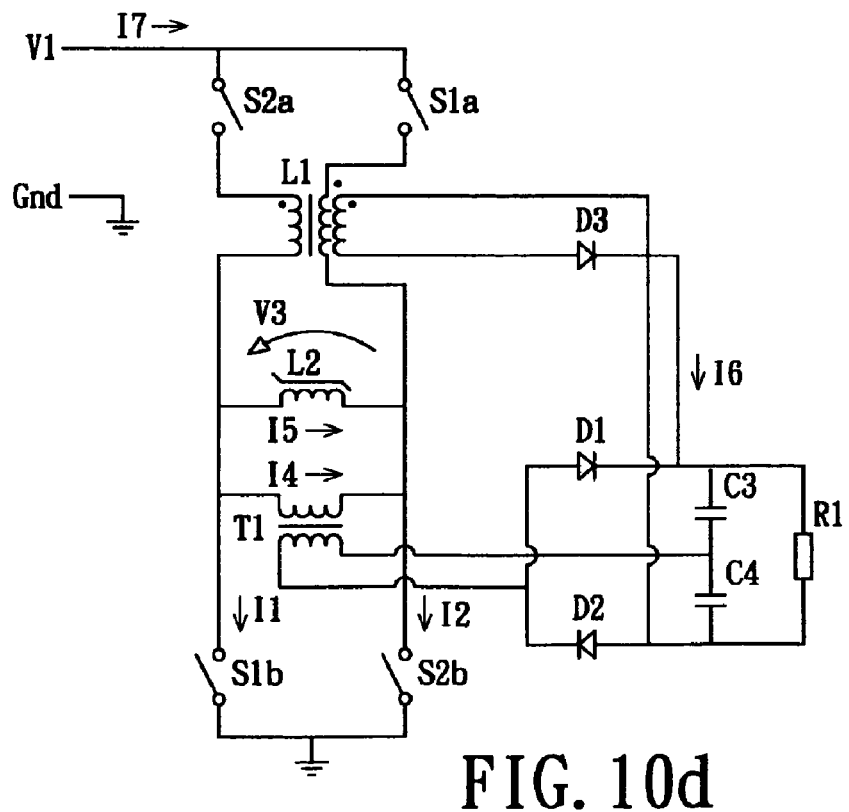
FIG. 10d is a circuit diagram for an embodiment of yet another variant of the FIG. 10a according to the present invention.

FIGS. 10c and 10d are variants of FIGS. 10a and 10b. The main winding of energy storage inductor L1 is split into mutually coupled first and second main windings. The first main winding is connected in series with switch S1a to form a first inductor-switch combination, and the second main winding to switch S2a to form a second inductor-switch combination. With these two inductor-switch combinations and the two switches S1b and S2b connected in a bridge manner as shown in FIGS. 10c and 10d, the circuit operation is very similar to those of FIGS. 10a and 10b and can be explained the same way with all references to main winding changed to main windings.

Figure 11A:
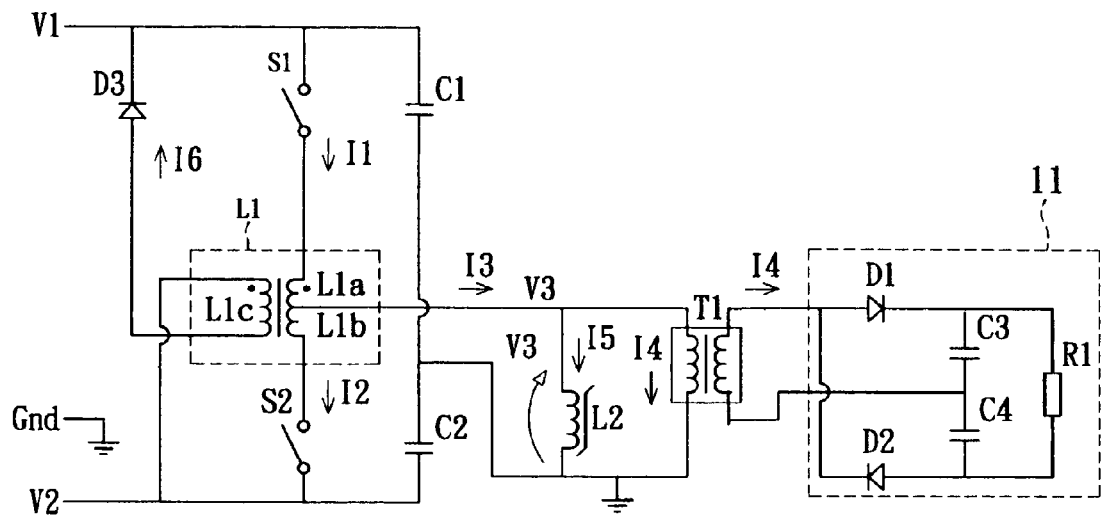
FIG. 11a is a circuit diagram for a further embodiment of an electric power conversion circuit according to the present invention.
Figure 11B:
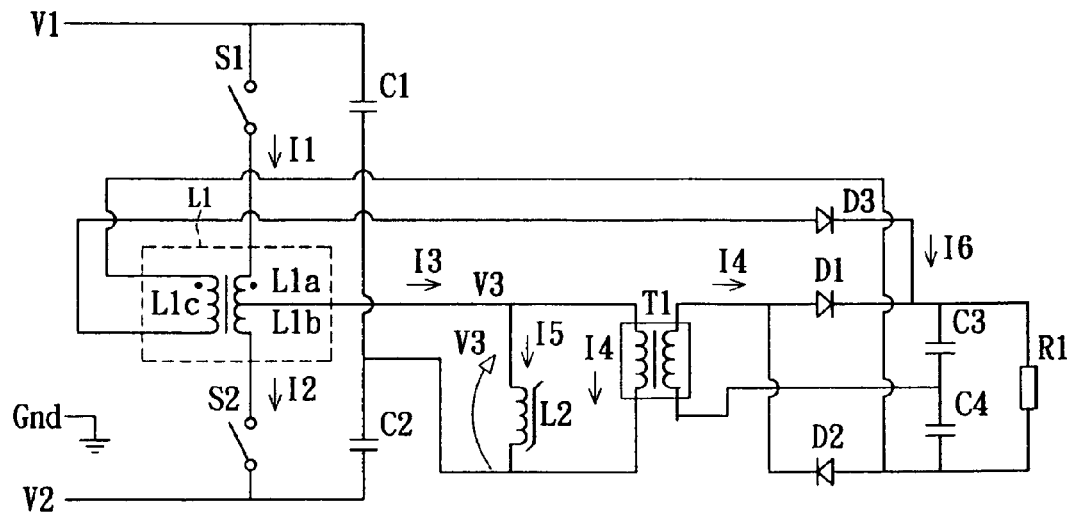
FIG. 11b is a circuit diagram for an embodiment of a variant of FIG. 11a according to the present invention.

Refer to FIGS. 11a and 11b, wherein half-bridge variants of the configurations in FIGS. 1c and 1d are shown. As depicted in FIGS. 11a and 11b, two capacitors C1 and C2 are added to the circuit in a half-bridge-like manner. The current I3, after flowing through the AC loading circuit 11 and saturable inductor L2, is to return to the input voltage source through these capacitors instead of the ground terminal. Because current I3 contains no DC components, providing that the C1 and C2 have sufficient capacitance, the presence of them does not affect circuit operation. The circuit operation can therefore be explained essentially the same way as those of FIGS. 1c and 1d.

Note that a similar variant can be applied to the embodiments of FIGS. 1a and 1b. That is, to return the current I3 back to the power supply through capacitors instead of a ground terminal. Because current I3 contains no DC components, providing that the capacitors have sufficient capacitance, the presence of them does not affect circuit operation. The circuit operation can therefore be explained essentially the same way as those of FIGS. 1a and 1b.

Because current I3 contains no DC components, returning current I3 to the power supply through a single capacitor instead of directly to a ground terminal as of FIGS. 1a, 1b, 1c and 1d is also possible. The circuit operation of such variances can respectively be explained essentially the same way as those of FIGS. 1a, 1b, 1c and 1d.

Figure 12A:
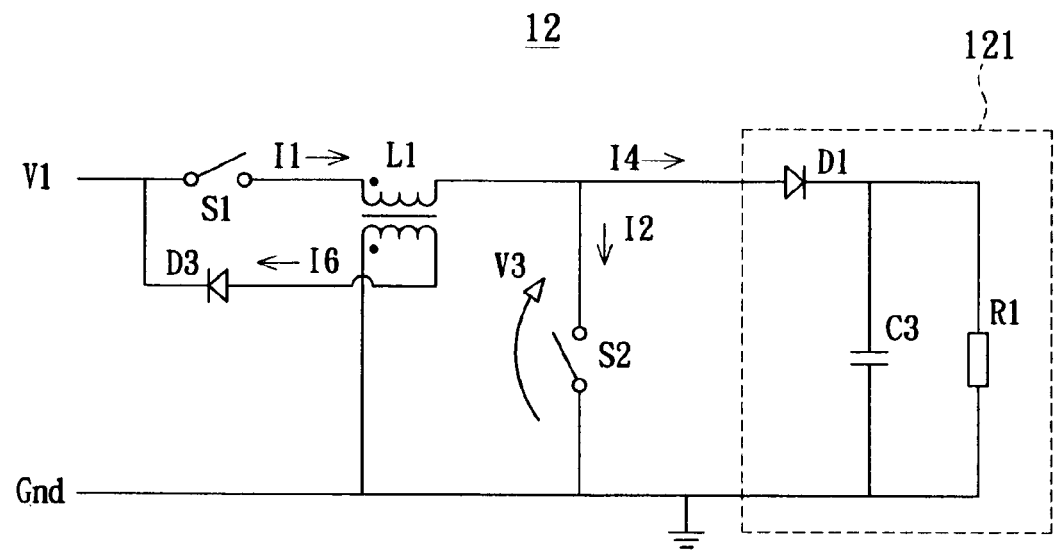
FIG. 12a is a circuit diagram for a yet further embodiment of an electric power conversion circuit according to the present invention.
Figure 12B:
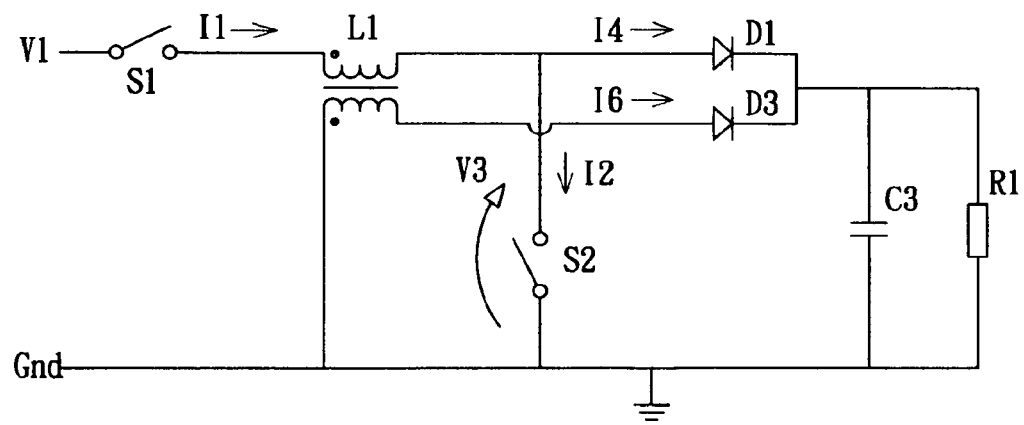
FIG. 12b is a circuit diagram for an embodiment of a variant of FIG. 12a according to the present invention.

Finally, refer to FIGS. 12a and 12b, wherein single-ended variants of the embodiments in FIGS. 1a and 1b are shown.

As depicted in FIG. 12a, the electric power conversion circuit 12 is powered by an input voltage source having a supply terminal V1, and a ground reference terminal Gnd. Block 121 represents a DC loading circuit which may contain within a rectifier diode D1 (the first rectifier diode), a capacitor C3 and a DC load R1. L1 is an energy storage inductor having a main winding and an auxiliary winding. These windings are magnetically coupled. A first switch S1 connects in series with the main winding of inductor L1 to form a switch-inductor combination, which connects the DC loading circuit to the supply terminal of the input voltage source. A second switch S2 connects the DC loading circuit to the ground reference terminal of the input voltage source. When both the first and second switches S1, S2 conduct, the main winding of the inductor L1 is connected across the supply and ground reference terminals of the input voltage source, and a current represented by I1 or I2 may flow through the main winding to charge magnetic energy into the inductor L1. When only the first switch S1 conducts, the DC loading circuit 121 is connected to the supply terminal V1 of the input voltage source via the main winding of inductor L1, and the current I1 may flow through the main winding into the DC loading circuit 121. The inductor L1 may be magnetically charged or discharged by current I1 depending on operating modes.

There also is a rectifier diode D3 which connects in series with the auxiliary winding of the inductor to form an inductor-diode combination. The polarity of the rectifier diode is so arranged that a flyback current I6 is allowed to flow when the first switch S1 disconnects. In this variant, the inductor-diode combination is connected across the supply and ground reference terminals of the input voltage source, such that the flyback current I6 may return energy to the input voltage source.

FIG. 12b is similar to FIG. 12a but with the inductor-diode combination connected across the DC load R1 within the DC loading circuit 121, such that the flyback current I6 may return energy to the DC load R1.

The working principles of these circuits are similar. The details are explained below with reference to waveforms in FIGS. 13 and 14. Labels used in these figures are common with those of FIGS. 12a and 12b.

Figure 13:
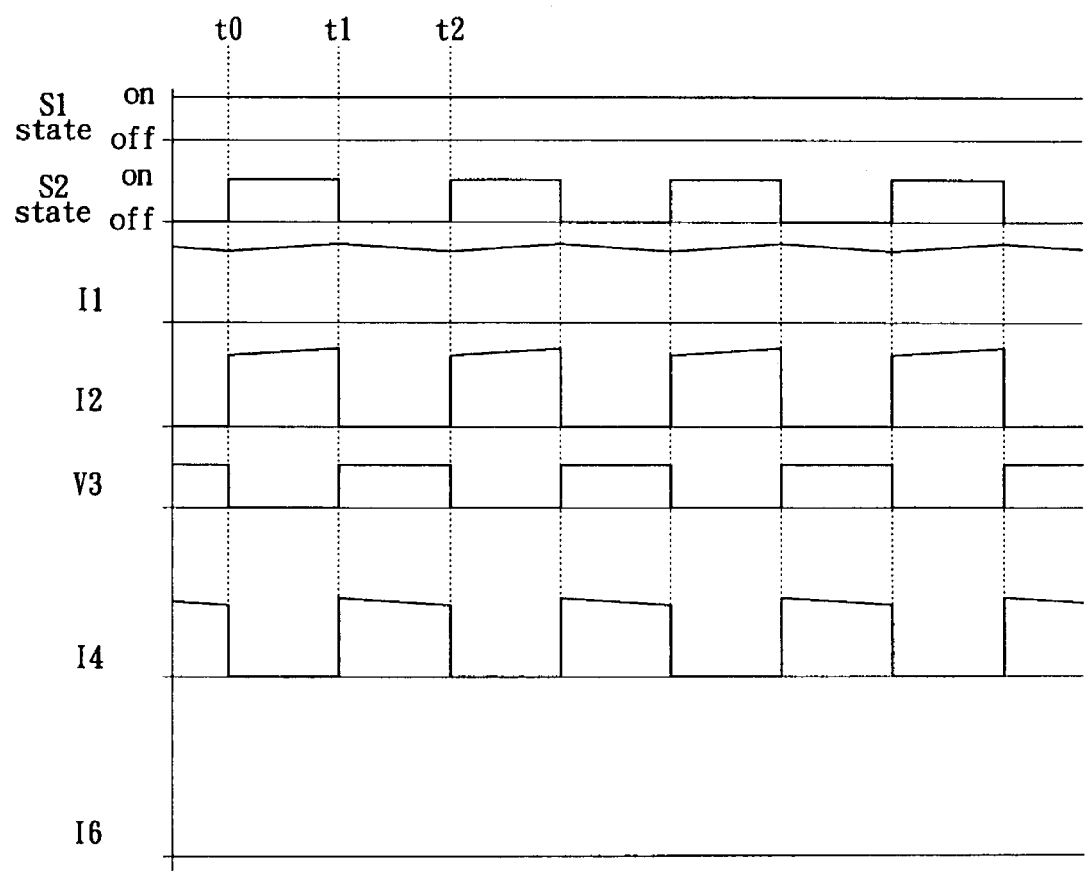
FIG. 13 is an operational waveform diagram for the embodiments of FIGS. 12a and 12b on boost mode according to the present invention.

Refer to FIG. 13, this is the waveform diagram of high duty cycle operation. On high duty cycle, flyback energy of the energy storage inductor L1 is absorbed by the DC loading circuit and hence there is no current flowing through the auxiliary winding of the energy storage inductor L1. Current I6 is therefore zero. Details of the operations follow:

During a period of time from t0 to t1, both of the switches S1 and S2 are put to on state. Currents I1 (equates current I2) is gradually increasing when it charge magnetic energy into L1 through its main winding. Voltage across the DC loading circuit 121, V3, is zero and so does current into the DC loading circuit 121, I4.

At time t1, the second switch S2 is put to off state. I2, the current flowing through S2, is interrupted. Current I1 is forced into the DC loading circuit 121 making an output current I4. The voltage across DC loading circuit 121, V3, is hence established. This condition is maintained through out a time period from t1 to t2. Magnetic energy is extracted from the energy storage inductor L1, and the inductor current I1 is gradually decreasing during this period.

Note that since the output current I4 is flowing from the supply terminal V1 of the voltage source through the first switch S1, a good part of power known as direct power is extracted from the input voltage source. Such direct power has not gone through magnetic conversion and hence does not suffer from conversion loss. Overall conversion efficiency of the circuit is therefore improved.

At time t2, the second switch S2 is put back to on state. Both of the switches S1 and S2 are conducting and the waveforms and circuit states return to those of time t0. Subsequent operation is a cyclical perpetuation of the events from time t0 to t2.

In this mode of operation, the peak voltage to the DC loading circuit 121, V3, is a sum of the input voltage at supply terminal V1 and the inductor main winding flyback voltage. This is essentially a boost mode operation which the transfer gain is variable from unity (1) to arbitrarily high.

Figure 14:
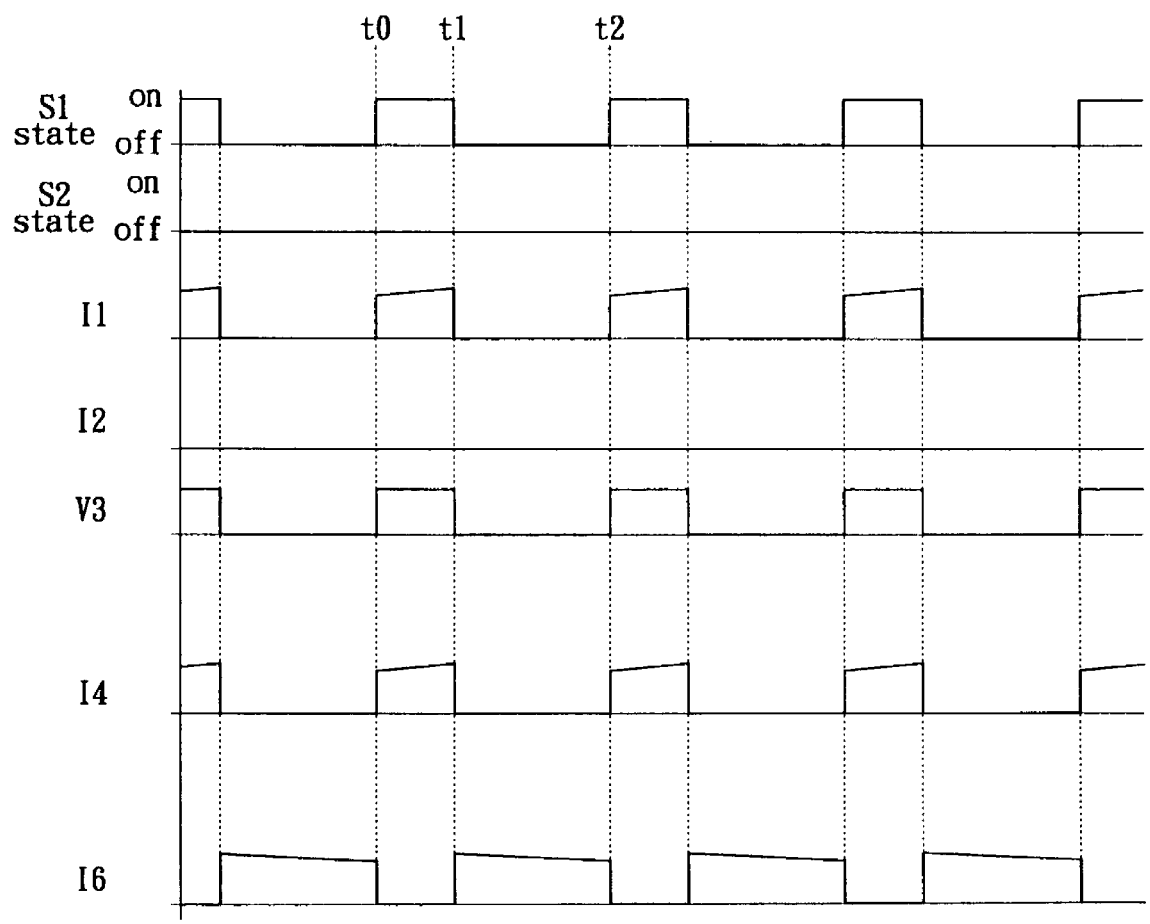
FIG. 14 is an operational waveform diagram for the embodiments of FIGS. 12a and 12b on buck mode according to the present invention.

Refer to FIG. 14, this is the waveform diagram of low duty cycle operation. On low duty cycle operation, the switches S1 is put periodically to off state, interrupting the current I1 flowing through the main winding of the inductor L1. The flyback energy so generated must be absorbed by a circuit connecting through rectifier diode D3 across the auxiliary winding. It is desirable to connect the auxiliary winding of inductor L1 through D3 across a DC load R1 as shown in FIG. 12b, so that the flyback energy is forwarded to the load contributing a part of output power. But the auxiliary winding of inductor L1 and the rectifier diode D3 may also connect to the input voltage source as shown in FIG. 12a. Details of operation for these connections are similar:

During a period of time from t0 to t1, the second switch S2 is put to off state and the first switch S1 to on state. Voltage from the supply terminal V1 is applied to the DC loading circuit 121 through the first switch S1 and the energy storage inductor L1 main winding. Voltage V3 is developed across the DC loading circuit 121. Current I1 is gradually increasing when it charges magnetic energy into the inductor L1 through the main winding. Current into the DC loading circuit 121, I4 equals current I1.

Note that the output current I4 is flowing from the supply terminal V1 of the voltage source. Direct power is transferred from the input voltage source to the output circuit without going through magnetic conversions.

At time t1, the first switch S1 is put to off state. I1, the current flowing through the first switch S1, is interrupted and inductively reflected to the auxiliary winding to form a flyback current I6. The output current I4 is interrupted. Voltage V3 is left floating and returning gradually to zero. This condition is sustained through out a time period from t1 to t2. Magnetic energy is extracted from the energy storage inductor L1, and the flyback current I6 is gradually decreasing during this period. If the auxiliary winding is connected through the rectifier diode D3 to a DC load R1 as shown in FIG. 12*b*, the flyback current I6 will flow into the DC load R1 and the energy discharged from the energy storage inductor L1 transferred to output circuit. But if the auxiliary winding is connected through the rectifier diode D3 to the input voltage source as shown in FIG. 12*a*, the flyback current I6 will flow to the input voltage source and energy discharged from L1 transferred back to the input circuit.

At time t2, the first switch S1 is put to on state. Waveforms and circuit states return to those of time t0. Subsequent operation is a cyclical perpetuation of the events from time t0 to t2.

In this mode of operation, the charging current I1 for energy storage inductor L1 flows through a loading circuit. We refer this mode of operation as buck mode because it is similar to ordinary buck converters. For embodiment of FIG. 12*b* even the inductor flyback current I6 flows into the DC load, making it a genuine buck converter. Like ordinary buck converters, transfer gain of the embodiment of FIG. 12*b* is variable from 0 to unity (1).

The illustrations disclosed heretofore set out only the detailed descriptions and drawings of the embodiments according to the present invention, rather than being used to restrict the present invention thereto; the scope of the present invention should be based on the subsequent claims, and all changes or modifications conveniently considered by those skilled ones in the art are deemed to be encompassed by the scope of the present invention delineated in the following claims of the present application.

What is claimed is:

1. An electric power conversion circuit, comprising:
    an input voltage source;
    a DC loading circuit, including a first rectifier diode and a DC load, wherein the first rectifier diode is coupled in series with the DC load;
    an inductor, having a main winding and an auxiliary winding;
    a first switch, connecting in series with the main winding of the inductor to form a switch-inductor combination;
    a second switch, connecting across the DC loading circuit; and
    a second rectifier diode, connecting in series with the auxiliary winding of the inductor to form an inductor-diode combination, wherein the polarity of the second rectifier diode is so arranged that reactive flyback current generated from disconnection of the first or second switches is allowed to flow;
    wherein, the switch-inductor combination and the DC loading circuit are connected in series across the input voltage source, such that when the first switch conducts, the first rectifier diode is forward biased to allow current from the input voltage source to flow through the DC load.

2. The electric power conversion circuit according to claim 1, wherein the input voltage source is connected across the inductor-diode combination for absorbing electric power which is transferred from the auxiliary winding.

3. The electric power conversion circuit according to claim 1, wherein the DC load is connected across the inductor-diode combination for absorbing electric power which is transferred from the auxiliary winding.

4. An electric power conversion circuit, comprising:
    an input voltage source, having a supply terminal and a return terminal;
    a transformer, having a secondary winding and a primary winding, wherein the primary winding has a first end terminal, a second end terminal, and a tapping terminal;
    an AC loading circuit, connecting across the secondary winding of the transformer;
    an inductor, having a main winding and an auxiliary winding, wherein the main winding connects in series between the tapping terminal of the transformer and the supply terminal of the input voltage source;
    a first switch, connecting across the return terminal and the first end terminal;
    a second switch, connecting across the return terminal and the second end terminal; and
    a rectifier diode, connecting in series with the auxiliary winding of the inductor to form an inductor-diode combination; wherein, the polarity of the rectifier diode is so arranged that reactive flyback current generated from disconnection of any of the first or second switches is allowed to flow;
    whereby, when both the first switch and the second switch conduct, the input voltage source magnetizes the inductor.

5. The electric power conversion circuit according to claim 4, further comprising a saturable inductor which is connected across the AC loading circuit.

6. The electric power conversion circuit according to claim 4, wherein the input voltage source is connected across the inductor-diode combination for absorbing electric power which is transferred from the auxiliary winding.

7. The electric power conversion circuit according to claim 4, wherein the AC loading circuit comprises a rectifier circuit and a DC load, and the DC load is coupled with the rectifier circuit.

8. The electric power conversion circuit according to claim 7, wherein the DC load is connected across the inductor-diode combination for absorbing electric power which is transferred from the auxiliary winding.

9. An electric power conversion circuit, comprising:
    an input voltage source, having a positive terminal, a negative terminal, and a ground reference terminal;
    an AC loading circuit, having a first end terminal and a second end terminal, and the second end terminal is coupled with the ground reference terminal;
    an inductor, having a first main winding, a second main winding, and an auxiliary winding;
    a first switch, connecting in series with the first main winding of the inductor to form a first switch-inductor combination;
    a second switch, connecting in series with the second main winding of the inductor to form a second switch-inductor combination; and
    a rectifier diode, connecting in series with the auxiliary winding of the inductor to form an inductor-diode combination; wherein, the polarity of the rectifier diode is so arranged that reactive flyback current generated from disconnection of any of the first or second switches is allowed to flow;

whereby, the first switch-inductor combination is coupled between the first end terminal and the positive terminal, the second switch-inductor combination is coupled between the first end terminal and the negative terminal, when both the first switch and the second switch conduct, the input voltage source magnetizes the inductor.

10. The electric power conversion circuit according to claim 9, wherein the second end terminal of the AC loading circuit is coupled with the positive terminal, the negative terminal, or the ground reference terminal through a capacitor.

11. The electric power conversion circuit according to claim 9 or 10, wherein the AC loading circuit comprising an isolation transformer.

12. The electric power conversion circuit according to claim 9 or 10, further comprising a saturable inductor which is connected across the AC loading circuit.

13. The electric power conversion circuit according to claim 9 or 10, wherein the input voltage source is connected across the inductor-diode combination for absorbing electric power which is transferred from the auxiliary winding.

14. The electric power conversion circuit according to claim 9 or 10, wherein the AC loading circuit comprises a rectifier circuit and a DC load, and the DC load is coupled with the rectifier circuit.

15. The electric power conversion circuit according to claim 14, wherein the DC load is connected across the inductor-diode combination for absorbing electric power which is transferred from the auxiliary winding.

16. An electric power conversion circuit, comprising:
an input voltage source, having a supply terminal and a return terminal;
an AC loading circuit, having a first end terminal and a second end terminal;
an inductor, having a main winding and an auxiliary winding, wherein one end of the main winding connects to the supply terminal of the input voltage source;
a first switch, connecting across the first end terminal of the AC loading circuit and the other end of the main winding of the inductor;
a second switch, connecting across the second end terminal of the AC loading circuit and the said other end of the main winding of the inductor;
a third switch, connecting across the second end terminal of the AC loading circuit and the return terminal of the input voltage source;
a fourth switch, connecting across the first end terminal of the AC loading circuit and the return terminal of the input voltage source; and
a rectifier diode, connecting in series with the auxiliary winding of the inductor to form an inductor-diode combination; wherein, the polarity of the rectifier diode is so arranged that reactive flyback current generated from disconnection of any of the first, second, third, or fourth switches is allowed to flow.

17. The electric power conversion circuit according to claim 16, wherein the AC loading circuit comprising an isolation transformer.

18. The electric power conversion circuit according to claim 16, further comprising a saturable inductor which is connected across the AC loading circuit.

19. The electric power conversion circuit according to claim 16, wherein the input voltage source is connected across the inductor-diode combination for absorbing electric power which is transferred from the auxiliary winding.

20. The electric power conversion circuit according to claim 16, wherein the AC loading circuit comprises a rectifier circuit and a DC load, and the DC load is coupled with the rectifier circuit.

21. The electric power conversion circuit according to claim 20, wherein the DC load is connected across the inductor-diode combination for absorbing electric power which is transferred from the auxiliary winding.

22. An electric power conversion circuit, comprising:
an input voltage source, having a supply terminal and a return terminal;
an AC loading circuit, having a first end terminal and a second end terminal;
an inductor, having a first main winding, a second main winding, and an auxiliary winding;
a first switch, connecting in series with the first main winding of the inductor to form a first switch-inductor combination;
a second switch, connecting in series with the second main winding of the inductor to form a second switch-inductor combination;
a third switch, connecting across the second end terminal of the AC loading circuit and the return terminal;
a fourth switch, connecting across the first end terminal of the AC loading circuit and the return terminal; and
a rectifier diode, connecting in series with the auxiliary winding of the inductor to form an inductor-diode combination; wherein, the polarity of the rectifier diode is so arranged that reactive flyback current generated from disconnection of any of the first, second, third, or fourth switches is allowed to flow;
whereby, the first switch-inductor combination is coupled between the first end terminal and the supply terminal, the second switch-inductor combination is coupled between the second end terminal and the supply terminal.

23. The electric power conversion circuit according to claim 22, wherein the AC loading circuit comprising an isolation transformer.

24. The electric power conversion circuit according to claim 22, further comprising a saturable inductor which is connected across the AC loading circuit.

25. The electric power conversion circuit according to claim 22, wherein the input voltage source is connected across the inductor-diode combination for absorbing electric power which is transferred from the auxiliary winding.

26. The electric power conversion circuit according to claim 22, wherein the AC loading circuit comprises a rectifier circuit and a DC load, and the DC load is coupled with the rectifier circuit.

27. The electric power conversion circuit according to claim 26, wherein the DC load is connected across the inductor-diode combination for absorbing electric power which is transferred from the auxiliary winding.

* * * * *